US007487351B2

(12) United States Patent
Ayaki et al.

(10) Patent No.: US 7,487,351 B2
(45) Date of Patent: Feb. 3, 2009

(54) DATA USE MANAGEMENT SYSTEM, TRANSMITTING APPARATUS HAVING MANAGEMENT FUNCTION, AND DATA USE MANAGEMENT METHOD

(75) Inventors: Yasushi Ayaki, Osaka (JP); Naoshi Usuki, Kyoto (JP); Yoshihiro Morioka, Nara (JP); Natsume Matsuzaki, Osaka (JP); Yuusaku Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 802 days.

(21) Appl. No.: 10/806,272

(22) Filed: Mar. 22, 2004

(65) Prior Publication Data

US 2004/0193881 A1 Sep. 30, 2004

(30) Foreign Application Priority Data

Mar. 26, 2003 (JP) ............................. 2003-085085

(51) Int. Cl.
*H04L 9/00* (2006.01)
(52) U.S. Cl. .............................. 713/168; 726/2; 726/31; 715/741; 715/743
(58) Field of Classification Search ................. 713/168; 726/31, 2; 709/225; 711/163; 715/741, 715/743
See application file for complete search history.

(56) References Cited

U.S. PATENT DOCUMENTS

| 5,845,065 | A  | * | 12/1998 | Conte et al. ................. 726/31 |
| 6,170,019 | B1 | * | 1/2001  | Dresel et al. ................ 719/330 |
| 6,560,648 | B1 | * | 5/2003  | Dunn et al. .................. 709/224 |
| 6,868,434 | B1 | * | 3/2005  | Terranova et al. ........... 709/203 |
| 7,028,073 | B1 | * | 4/2006  | Bui et al. ..................... 709/203 |
| 2001/0005890 | A1 | | 6/2001 | Nitaki |
| 2004/0030912 | A1 | * | 2/2004 | Merkle et al. ............... 713/200 |

FOREIGN PATENT DOCUMENTS

| CN | 1301095      | 6/2001  |
| JP | 2000-049852  | 2/2000  |
| JP | 2001-285284  | 10/2001 |

OTHER PUBLICATIONS

"Ping" from Wikipedia, the free encyclopedia. Revision published Feb. 25, 2002. http://en.wikipedia.org/w/index.php?title=Ping &oldid=918290.*
Microsoft Technet: Remote access troubleshooting tools. Article Published Jan. 15, 2003 http://technet.microsoft.com/en-us/library/bb742494(printer).aspx.*
Chinese Office Action dated Feb. 17, 2006 for corresponding Application No. 2004-10033220.0 w/English Translation.

* cited by examiner

*Primary Examiner*—Kimyen Vu
*Assistant Examiner*—Thomas Gyorfi
(74) *Attorney, Agent, or Firm*—RatnerPrestia

(57) ABSTRACT

The conventional method of limiting the number of receiving apparatus has a problem that if the limited number of appliances is reduced to limit distribution to unspecified appliances outside a home, distribution to appliances in the home is limited unnecessarily. If the limited number of appliances is increased, distribution to appliances outside the home cannot be sufficiently limited. The invention provides at least one receiving apparatus, (e.g., digital television sets and PCs,) connected to a network and capable of receiving and using predetermined data, and a transmitting apparatus, (e.g., an AV server) for transmitting the data to the receiving apparatus via the network. Use of the data on the network is managed based on the transmission time required for transmission of predetermined information between the transmitting apparatus and the receiving apparatus.

21 Claims, 23 Drawing Sheets

DATA USE MANAGEMENT SYSTEM, TRANSMITTING APPARATUS HAVING MANAGEMENT FUNCTION, AND DATA USE MANAGEMENT METHOD

BACKGROUND OF THE INVENTION

1. Field of the Invention

The present invention relates to a data use management system, a transmitting apparatus having a management function, a data use management method, and so on which are used for, for example, management of use of data which needs copyright protection.

2. Related Art of the Invention

In recent years, implementation of home networks, in which appliances are connected in a home to share information, has been pursued. In one form of a home network, a router is provided in a home. An AV server, which accumulates information contents, appliances including a personal computer (PC) and a digital television set are connected in a star configuration to the router. The router connects the network in the home to a network outside the home. The AV server in the home has the functions of temporarily storing various information contents obtained through the router from networks outside the home and information contents obtained from means other than networks, such as digital broadcasting, and transmitting stored information contents to an appliance when receiving a request from another appliance.

When data for which a copyright exists, e.g., new films, pay television programs and music, there is a need to protect copyrights. As an effective method of protecting copyrights, a method is known in which data which needs copyright protection is encrypted to limit use of the data.

For example, in a case where there is a need to copyright-protect audio-visual data (hereinafter referred to as AV data) when the AV data is used and transmitted, the AV data is encrypted before being transmitted. For example, the DTCP (Digital Transmission Content Protection) system was standardized as such a protection method.

The DTCP system has the function of performing authentication and the function of making a key ineffective. At the time of transmission of AV data, the DTCP system excludes unauthorized appliances, which have not been authenticated, and encrypts and transmits data which needs copyright protection. This inhibits use of AV data with unauthorized appliances. Copyright protection is achieved in this manner.

Use of AV data which needs copyright protection is ordinarily limited to personal use in homes. Therefore, there is also a need to limit the distribution of AV data from an AV server in a home to unspecified receiving apparatus outside the home.

In the DTCP system, when a transmitting apparatus is requested by receiving apparatus to provide data (exchanged key) for producing a key for decrypting a cryptogram, the number of receiving apparatus on which authentication is executed (authentication count) is limited to limit the number of receiving apparatus enabled to decrypt encrypted contents.

In Internet technology, a method of using time to live (TTL) is known as a means of limiting the reachable range of transmitted data. TTL represents the time for which a packet lives in IPv4, and corresponds to the number of relays in IPv6.

According to this method, the number of routers via which IP packets can be sent can be set by a value set in a TTL field in an IP packet header. (See, for example, Japanese Patent Laid-Open No. 2000-49852 (e.g., page 3, FIG. 7). The disclosure of this document is incorporated herein by reference in its entirety.)

If, for example, TTL is set to TTL=1 in a transmitting apparatus which transmits AV data, it is written into TTL=0 at the time of passage through a router provided in a home and this AV data is discarded in a router outside the home and cannot reach any unspecified receiving apparatus outside the home.

The above-described methods for preventing AV data from being limitlessly distributed to unspecified receiving apparatus outside a home have drawbacks described below.

First, the method of limiting the number of receiving apparatus to which contents are distributed in the DTCP system has a problem described below.

This method only limits the number of receiving apparatus without discrimination as to whether one receiving apparatus exists in or out of a home. In use of this method, therefore, the distribution to appliances in a home essentially permissible with no problem is limited when the limit number of appliances is reduced for the purpose of limiting the distribution to unspecified appliances outside the home. Conversely, when the limit number of appliances is increased to avoid limiting the distribution to appliances in the home, the distribution to appliances outside the home to be limited cannot be sufficiently limited.

Second, the method of limiting the number of passable routers by selecting the time to live has a problem described below.

In Internet technology, a device which transmits IP packets in a local network by temporarily encapsulating the IP packets and restores the IP packets by decapsulating the packets is known as a VPN (Virtual Private Network) device. The VPN device can connect a network in a home to a network outside the home, and the above-mentioned TTL value is not changed by passage through the VPN device. Therefore, the distribution to unspecified out-of-home appliances by the VPN device cannot be limited by using TTL.

Therefore, an object of the present invention is to provide a data use management system, a transmitting apparatus having a management function, a data use management method, and so on which are capable of executing the distribution of data to receiving apparatus in a home with no problem in practice while limiting the distribution of data for unspecified receiving apparatus outside the home.

SUMMARY OF THE INVENTION

The $1^{st}$ aspect of the present invention is a data use management system comprising at least one receiving apparatus connected to a network and capable of receiving and using predetermined data, and a transmitting apparatus which transmits the data to said receiving apparatus via said network, wherein use of the data on said network is managed on the basis of the transmitting time required for transmission of predetermined information between said transmitting apparatus and said receiving apparatus.

The $2^{nd}$ aspect of the present invention is the data use management system according to the $1^{st}$ aspect of the present invention, wherein said transmitting apparatus has:

transmission time measuring means of measuring the transmission time required for transmission of predetermined information for measurement between said transmitting apparatus and said receiving apparatus;

reference time storage means of storing at least one reference time;

transmitting-side authentication means of comparing the transmission time and the reference time, thereby determining to which one of ranges of transmission time classified on the basis of the reference time the transmission time belongs, determining, on the basis of the result of said determination, whether or not said receiving apparatus having the transmission time can be permitted to use the predetermined data, and performing authentication if said receiving apparatus can be permitted to use the predetermined data; and authentication count means of incrementing an authentication count which is the number of instances of authentication performed by said transmitting-side authentication means, wherein said receiving apparatus has receiving-side authentication means of performing authentication with said transmitting-side authentication means, and wherein said transmitting apparatus compares the authentication count with a maximum authentication count determined in advance with respect to each of the ranges of transmission time, and inhibits further authentication if the authentication count is larger than the maximum authentication count.

The $3^{rd}$ aspect of the present invention is a transmitting apparatus having a management function for enabling at least one receiving apparatus connected to a network and capable of receiving and using predetermined data to use the data by means of said network, said transmitting apparatus comprising:

transmission time measuring means of measuring the transmission time required for transmission of predetermined information for measurement between said transmitting apparatus and said receiving apparatus;

reference time storage means of storing at least one reference time;

transmitting-side authentication means of comparing the transmission time and the reference time, thereby determining to which one of ranges of transmission time classified on the basis of the reference time the transmission time belongs, determining, on the basis of the result of said determination, whether or not said receiving apparatus corresponding the transmission time can be permitted to use the predetermined data, and performing authentication if said receiving apparatus can be permitted to use the predetermined data;

authentication count means of incrementing the authentication count which is the number of instances of authentication performed by said transmitting-side authentication means; and the management function of comparing the authentication count with a maximum authentication count determined in advance with respect to each of the ranges of transmission time, and inhibiting further authentication if the authentication count is larger than the maximum authentication count.

The $4^{th}$ aspect of the present invention is the transmitting apparatus having the management function according to the $3^{rd}$ aspect of the present invention, wherein said receiving apparatus has a unique identifier, and wherein, when said transmitting-side authentication means performs authentication with said receiving device, and the authentication on said receiving apparatus results in success, said transmitting-side authentication means identifies said receiving apparatus through said identifier.

The $5^{th}$ aspect of the present invention is the transmitting apparatus having the management function according to the $4^{th}$ aspect of the present invention, wherein when an authentication request is sent from said receiving apparatus aid transmitting-side authentication means determines, through said identifier, whether or not from which the authentication request received from the receiving apparatus is the same as said receiving apparatus on which authentication has already been made successfully.

The $6^{th}$ aspect of the present invention is the transmitting apparatus having the management function according to the $3^{rd}$ aspect of the present invention, wherein if the authentication count is equal to or larger than the predetermined maximum authentication count, said transmitting-side authentication means performs such control that said transmitting-side authentication means does not accept the authentication request from said receiving apparatus.

The $7^{th}$ aspect of the present invention is the transmitting apparatus having the management function according to the $3^{rd}$ aspect of the present invention, further comprising reference time setting means of setting the reference time on the basis of the result of measurement of the transmission time required for transmission of the information for measurement over a predetermined reference route.

The $8^{th}$ aspect of the present invention is the transmitting apparatus having the management function according to the $3^{rd}$ aspect of the present invention, wherein said transmitting-side authentication means sets the maximum authentication count to a smaller value on the basis of the result of said classification.

The $9^{th}$ aspect of the present invention is the transmitting apparatus having the management function according to the $8^{th}$ aspect of the present invention, wherein said transmitting-side authentication means sets, with respect to each class in said classification, a count increment value by which said authentication count means increments the count.

The $10^{th}$ aspect of the present invention is the transmitting apparatus having the management function according to the $3^{rd}$ aspect of the present invention, wherein the maximum authentication count is determined with respect to each class in said classification;

said authentication count means increments the authentication count with respect to each class in said classification; and said transmitting-side authentication means limits the authentication count so that the authentication count with respect to each class in said classification does not exceed the maximum authentication count.

The $11^{th}$ aspect of the present invention is the transmitting apparatus having the management function according to the $3^{rd}$ aspect of the present invention, further comprising attribute information management means of managing attribute information about the predetermined data transmitted over said network, wherein said transmitting-side authentication means limits the authentication count on the basis of the result of said classification and the attribute information.

The $12^{th}$ aspect of the present invention is the transmitting apparatus having the management function according to the $11^{th}$ aspect of the present invention, wherein copy control information is used as the attribute information.

The $13^{th}$ aspect of the present invention is the transmitting apparatus having the management function according to the $3^{rd}$ aspect of the present invention, further comprising medium type determination means of determining a type of medium in transmission routes constituting said network, wherein said transmitting-side authentication means sets the reference time according to the type of medium, and limits the authentication count according to the result of classification made on the basis of the set reference time.

The $14^{th}$ aspect of the present invention is the transmitting apparatus having the management function according to the $13^{th}$ aspect of the present invention, wherein when said medium type determination means detects the existence of a plurality of types of medium in the transmission routes, it selects the transmission medium type presumed to have the longest transmission time among the detected transmission media, and wherein said transmitting-side authentication means uses the selected type of medium for setting of the reference time.

The 15th aspect of the present invention is the transmitting apparatus having the management function according to the 3rd aspect of the present invention, further comprising transmission mode determination means of determining a transmission mode in the transmission routes constituting said network, wherein said transmitting-side authentication means does not execute limitation of the authentication count on the basis of the result of said classification if the determined transmission mode is a predetermined transmission mode with no need for authentication count limitation with respect to the transmission time.

The 16th aspect of the present invention is the transmitting apparatus having the management function according to the 3rd aspect of the present invention, further comprising billing information management means of managing billing information, wherein said transmitting-side authentication means limits the authentication count on the basis of the result of said classification and the billing information.

The 17th aspect of the present invention is the transmitting apparatus having the management function according to the 4th aspect of the present invention, wherein said transmitting-side authentication means registers the transmission time together with said identifier and keeps the maximum value of the authentication count equal to or smaller than a predetermined number by canceling at least one of the authentications of a plurality of the registered receiving apparatus if the authentication count reaches the maximum value when authentication is newly performed.

The 18th aspect of the present invention is the transmitting apparatus having the management function according to the 17th aspect of the present invention, wherein if the registered receiving apparatus has a transmission time longer than the transmission time measured at the time of newly performing authentication when the authentication of any one of the registered receiving apparatus is cancelled, said transmitting-side authentication means cancels the authentication of the registered receiving apparatus having the longest transmission time.

The 19th aspect of the present invention is the transmitting apparatus having the management function according to the 3rd aspect of the present invention, further comprising updating means of updating, according to input information externally supplied, at least one of the reference time and authentication count limitation conditions used by said transmitting-side authentication means.

The 20th aspect of the present invention is the transmitting apparatus according to any one of the 3rd to the 19th aspects of the present invention, wherein the data needs copyright protection.

The 21st aspect of the present invention is a data use management method comprising a step of;

when transmitting a predetermined data via a network to at least one receiving apparatus connected to the network and capable of receiving and using the predetermined data, managing the use of the data via the network on the basis of the transmitting time required for transmission of predetermined information to said receiving apparatus.

The 22nd aspect of the present invention is a program for making a computer function as the means of the transmitting apparatus having a management function according to the 3rd aspect of the present invention:

transmission time measuring means of measuring the transmission time required for transmission of predetermined information for measurement between said transmitting apparatus and said receiving apparatus;

the reference time storage means of storing at least one reference time;

transmitting-side authentication means of comparing the transmission time and the reference time, thereby determining to which one of ranges of transmission time classified on the basis of the reference time the transmission time belongs, determining, on the basis of the result of said determination, whether or not said receiving apparatus corresponding the transmission time can be permitted to use the predetermined data, and performing authentication if said receiving apparatus can be permitted to use the predetermined data;

authentication count means of incrementing the authentication count which is the number of instances of authentication performed by said transmitting-side authentication means.

The 23rd aspect of the present invention is a recording medium having the program according to the 22nd aspect of the present invention held thereon, said recording medium being capable of being processed with a computer.

DESCRIPTION OF SYMBOLS

Figure 1:
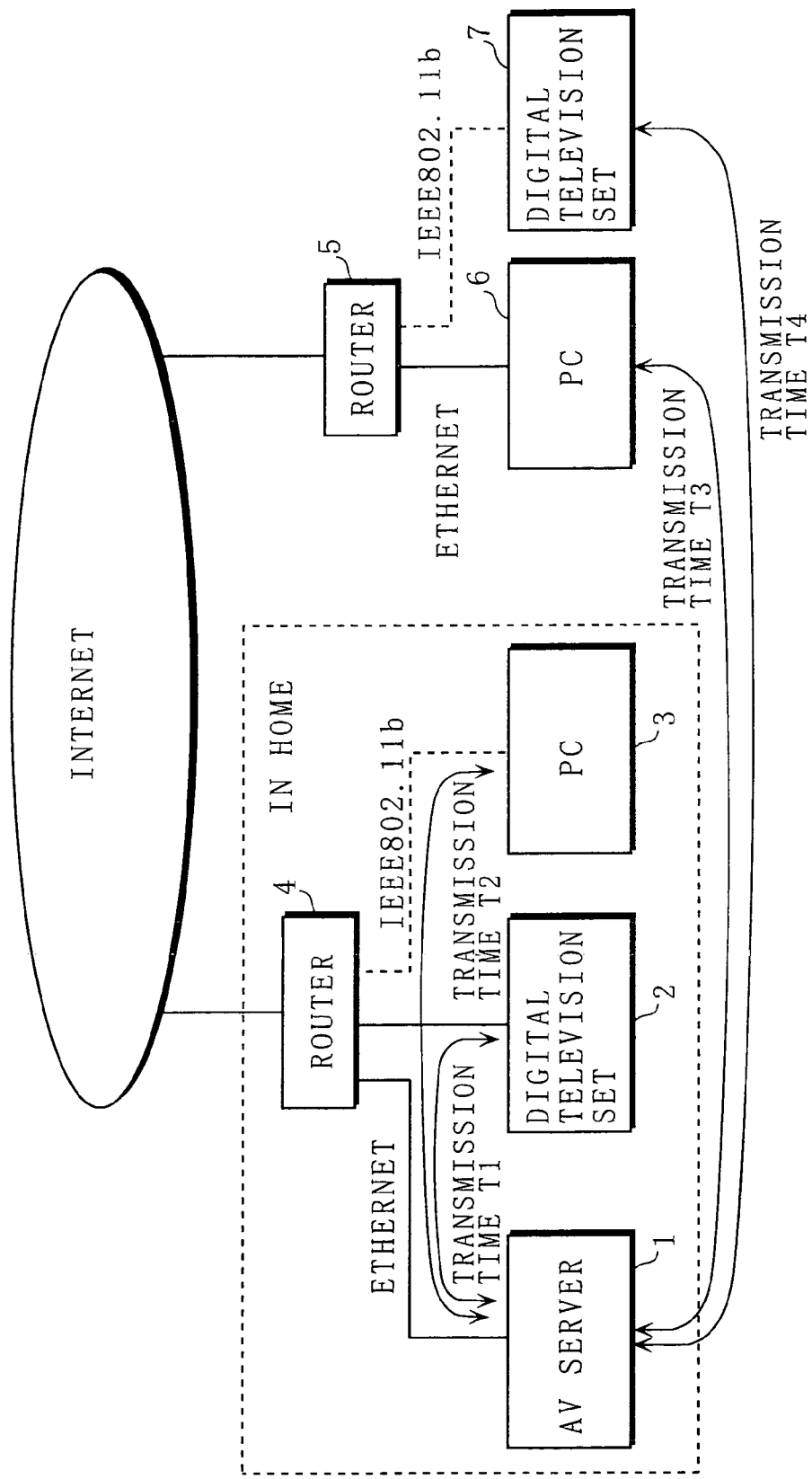
FIG. 1 is a diagram showing the configuration of a copyright protection system in Embodiments 1 to 7 of the present invention.

1 AV server
2 Digital television set
3 PC
4 Router
5 Router
6 PC
7 Digital television set
8 Receiving apparatus
21 Transmission and reception section
22 Encryption processing section
23 Authentication processing section
24 Authentication count section
25 Authentication count limitation section
26 Device information registration section
27 Transmission time measurement section
28 Reference time storage section
29 Time to live setting section
30 Limitation condition updating section
31 Transmission and reception section
32 Decryption processing section
33 Authentication request section
34 Authentication processing section
35 Measurement packet processing section
36 Receiving-side authentication rule storage section
41 Attribute information management section
42 Medium type determination section
43 Billing information management section
43 Transmission mode determination section

PREFERRED EMBODIMENTS OF THE INVENTION

Embodiments of the present invention will be described in detail with reference to the accompanying drawings.

Embodiment 1

<Outline>

In a copyright protection system of Embodiment 1, a transmitting apparatus transmits a packet for measurement to distribution-destination receiving apparatus, measures the transmission time on the basis of a response from each receiving apparatus, compares the measured transmission time with two reference times, and classifies the transmission times into lengths of transmission time on the basis of the reference time. When the transmission time is equal to or shorter than reference time Tth1, the transmitting circuit determines that the probability of the receiving apparatus existing in a home is high and executes ordinary authentication count limitation processing. When the transmission time is longer than the reference time Tth1 and equal to or shorter than reference time Tth2, the transmitting circuit determines that the receiving apparatus probably exists outside the home and executes authentication count limitation processing so that the maximum authentication count is smaller than that in the ordinary case. When the transmission time is longer than the reference time Tth2, the transmitting circuit determines that the probability of the receiving apparatus existing outside the home is high and executes authentication count limitation processing so that the maximum authentication count is further reduced.

<Configuration>

FIG. 1 is a diagram showing a transmitting apparatus and receiving apparatus constituting the copyright protection system of this embodiment, and connections therebetween. The transmitting apparatus is an AV server, while the receiving apparatus is a personal computer (PC), a digital television set and a router.

As shown in FIG. 1, the AV server 1, the digital television set 2, the PC 3 and the router 4 are placed in a home. The router 4 is connected to the AV server 1 and the digital television set 2 by a network in accordance with an Ethernet standard (10 (100)-BASE-T, the same also applying below). The router 4 and the PC 3 are connected to each other by a wireless medium (IEEE802.11b).

The router 4 is connected to a router 5 outside the home via the Internet. The router 5 is connected to a PC 6 and a digital television set 7 provided as receiving apparatus. The router 5 and the PC 6 are connected by a network in accordance with the Ethernet standard, and the router 5 and the digital television set 7 are connected to each other by a wireless medium (IEEE802.11b).

Figure 2:
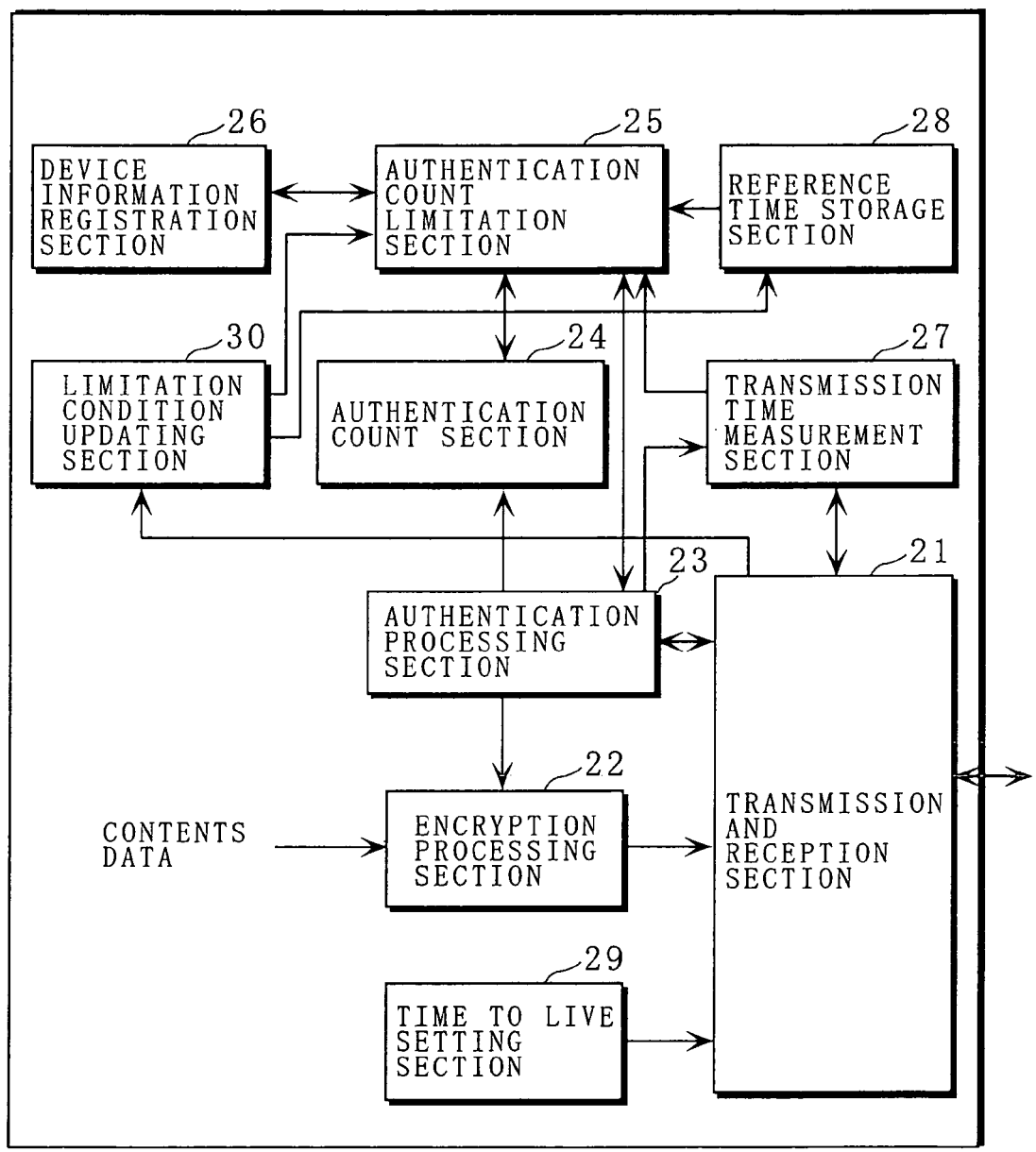
FIG. 2 is a diagram showing the configuration of an AV server in Embodiments 1, 3, and 7 of the present invention.

FIG. 2 shows the configuration of the transmitting apparatus, i.e., the AV server 1.

The AV server 1 includes a transmission and reception section 21, an encryption processing section 22, an authentication processing section 23, an authentication count section 24, an authentication count limitation section 25, a device information registration section 26, a transmission time measurement section 27, a reference time storage section 28, a time to live setting section 29, and a limitation condition updating section 30.

The transmission and reception section 21 is a digital interface through which AV data which needs copyright protection is transmitted to the network, and through which commands, etc., are transmitted to or received from other appliances connected to the network.

The encryption processing section 22 encrypts AV data reproduced from a contents recording section (not shown).

The authentication processing section 23 performs authentication of the receiving apparatus connected via the network, including the PC 3, the digital television set 2, the PC 6 and the digital television set 7, to enable use of AV data. ("Authentication" simply referred to below denotes authentication for use of AV data.)

The authentication count section 24 counts, according to the result of determination by the authentication count limitation section 25, the number of successful instances of authentication performed by the authentication processing section 23.

The device information registration section 26 stores device IDs successfully authenticated by the authentication processing section 23. The device IDs are given in advance as information for identification of the appliances by a key management center. It is assumed that the same methods as those in the conventionally used for DTCP are used with respect to authentication, an exchange key, and so on.

The authentication count limitation section 25 classifies transmission times measured by the transmission time measurement section 27 with reference to the reference times stored in the reference time storage section 28, and sets the maximum of the authentication count and a condition for increment of the authentication count section 24 on the basis of the results of classification. In the case of success in authentication performed by the authentication processing section 23, the authentication count limitation section 25 checks whether or not the authentication is duplication of authentication of the same appliance by utilizing a device ID stored in the device information storage means 26, and thereby makes a determination as to whether the authentication count made by the authentication count section 24 should be incremented.

The transmission time measurement section 27 generates a packet for measuring the transmission time before authentication processing, transmits through the transmission and reception section 21 the packet to each receiving apparatus making request for authentication processing, receives a response packet and measures the transmission time.

The reference time storage section 28 stores the two reference times for classification of transmission times and outputs the reference times to the authentication count limitation section 25.

The time to live setting section 29 is a means of setting the time to live (TTL) of a transmitted packet. The time to live setting section 29 sets in a transmitted packet a limit value of the number of routers to be passed. It is also assumed that this setting using TTL is performed by the same method as that in the prior art.

The limitation condition updating section 30 is a means of updating, according to updating data sent from the outside via the transmission and reception section 21, the condition value used in the authentication count limitation section 25 and the reference times used in the reference time storage section 28.

Figure 3:
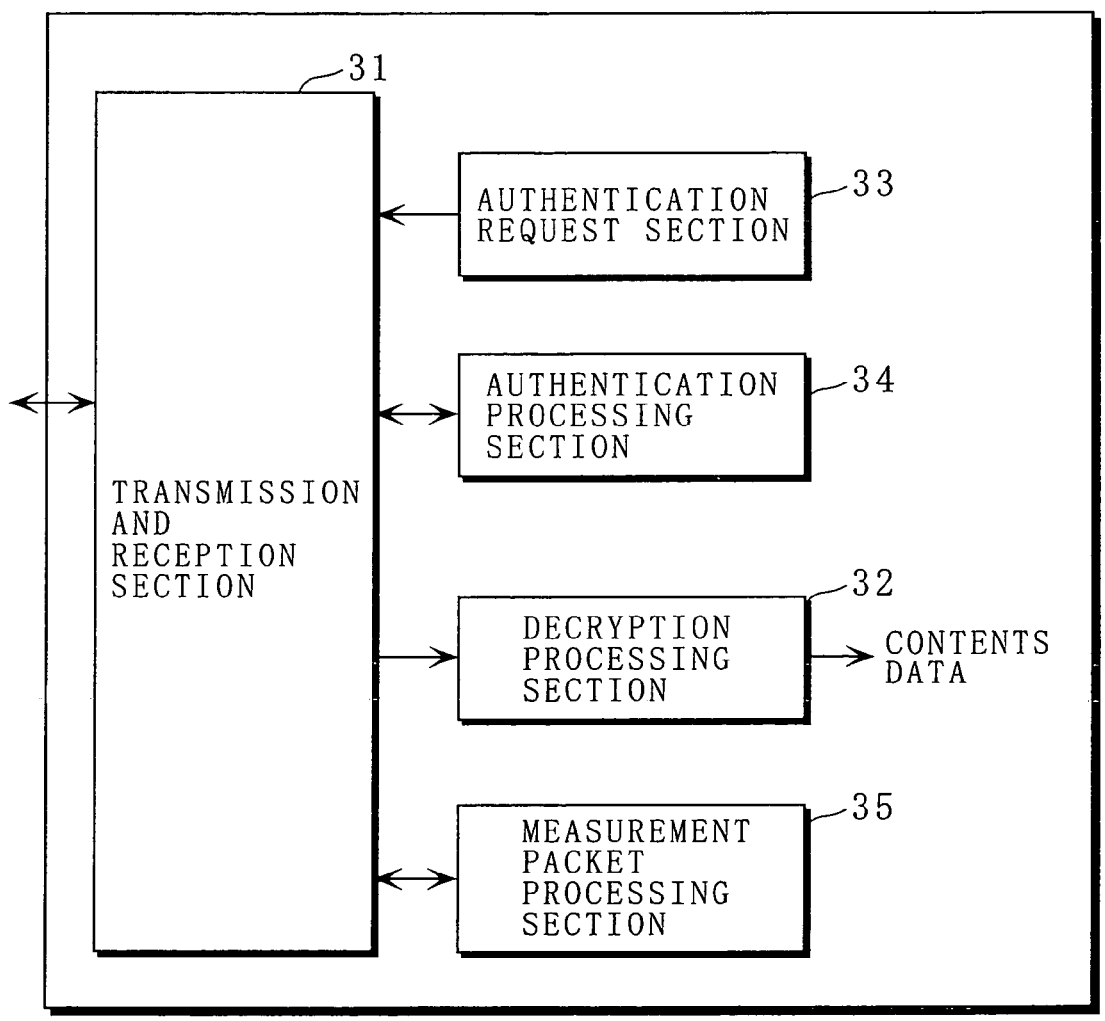
FIG. 3 is a diagram showing the configuration of a digital television set 2 in Embodiments 1 to 7 of the present invention.

The digital television set 2, the PC 3, the PC 6 and the digital television set 7 provided as receiving apparatus are of the same configuration. FIG. 3 shows the configuration of the receiving apparatus (digital television set 2).

The digital television set 2 includes a transmission and reception section 31, a decryption processing section 32, an authentication request section 33, an authentication processing section 34, and a measurement packet processing section 35.

The transmission and reception section 31 is a digital interface through which AV data which needs copyright protection and is transmitted to the network is received, and through which commands, etc., are transmitted to or received from other appliances connected to the network.

The decryption processing section 32 decrypts the cryptogram of received AV data which needs copyright protection. The plain-text AV data decrypted by the decryption processing section 32 is decoded by a decoder (not shown) and displayed on a monitor (not shown).

The authentication request section 33 is a means of transmitting an authentication command for requesting authentication (hereinafter referred to "authentication command") to the AV server 1.

The authentication processing section 34 is a means of performing authentication in cooperation with the authentication processing section 23 of the AV server 1.

The measurement packet processing section 35 is a means of performing reception processing on a packet for measurement transmitted from the AV server 1, generating a response packet and transmitting the response packet to the AV server 1 via the transmission and reception section 31.

In the above-described arrangement, the copyright protection system corresponds to the data use management system of the present invention; the AV server 1 corresponds to the transmitting apparatus having a management function; the digital television sets 2 and 7, the PCs 3 and 6 correspond to the receiving apparatus; and the Internet, the routers 4 and 5, the Ethernet and the wireless medium in accordance with IEEE802.11b as a whole correspond to the network of the present invention.

In the AV server 1 provided as the transmitting apparatus, the authentication processing section 23, the authentication count limitation section 25 and the device information registration section 26 constitute the transmitting-side authentication means of the present invention; the authentication count section 24 corresponds to the authentication count means of the present invention; the transmission time measurement section 27 corresponds to the transmission time measuring means of the present invention; the reference time storage section 28 corresponds to the reference time storage means of the present invention; and the limitation condition updating section 30 corresponds to the updating means of the present invention. The device ID corresponds to the identifier of the present invention.

<Operation>

A mode of implementation of the data use management method of the present invention will be described through description of the operation of this embodiment. Description of other embodiments will be made below in the same manner.

Figure 4:
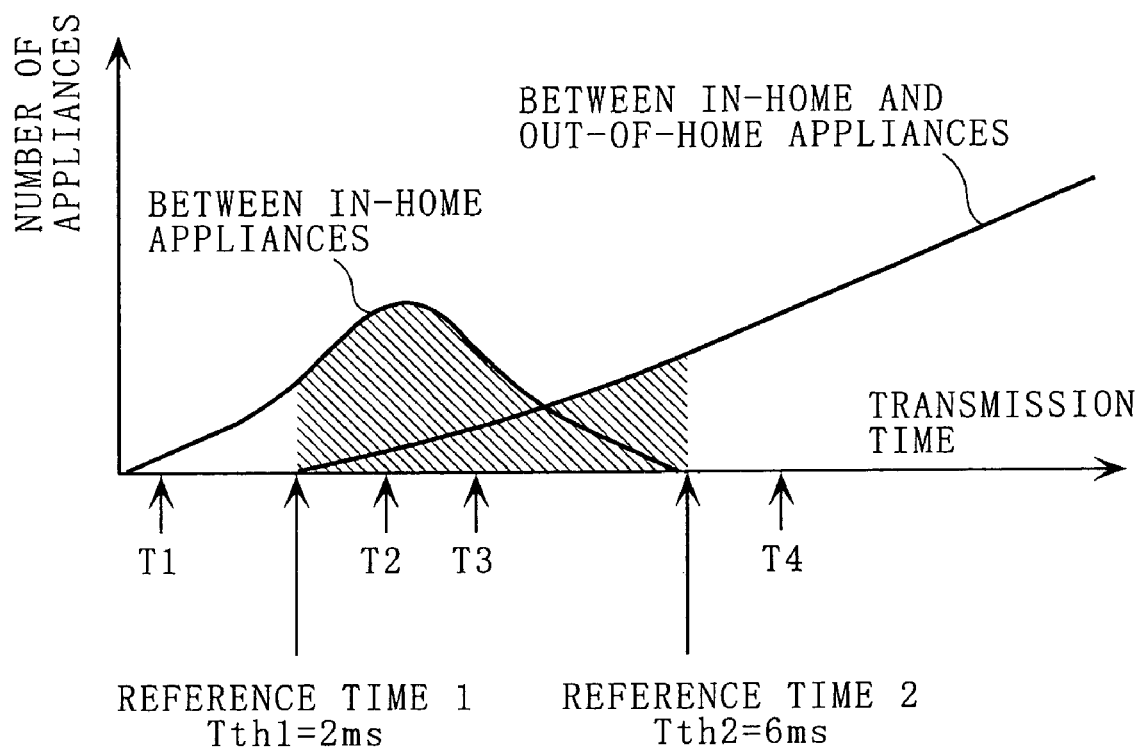
FIG. 4 is a diagram showing distributions of the number of receiving apparatus with respect to the transmission time in Embodiment 1 of the present invention.

FIG. 4 is a graph showing go-and-return times measured under various conditions as times required for transmission between in-home appliances and between in-home and out-of-home appliances. In FIG. 4, the abscissa represents the transmission time and the ordinate presents the distributions of the corresponding numbers of the appliances.

The time required for transmission between the appliances depends on the number of routers existing in the transmission route, the kind of transmission medium, etc. Ordinarily, a transmission delay in a cable medium such as Ethernet is small, while a transmission delay in a wireless transmission medium such as one in accordance with IEEE802.11b is large. A processing delay also occurs at the time of relaying of packets in the router.

Even in the case of transmission between the in-home appliances, the transmission time is increased if a wireless medium is included in the transmission route (for example, between the AV server 1 and the PC 3 in the system shown in FIG. 1). Even in the case of transmission between the in-home and out-of-home appliances, the transmission time is reduced if no transmission medium or router causing a large transmission delay is included in the transmission route (for example, between the AV server 1 and the PC 6 in the system shown in FIG. 1). Therefore, the distributions of the numbers of appliances with respect to the transmission times in the case of transmission between the in-home appliances and the distributions of the numbers of appliances with respect to the transmission time in the case of transmission between the in-home and out-of-home appliances overlap each other, as indicated by the hatched region in FIG. 1. By referring to the transmission time in this region, transmission between the in-home appliances and transmission between the in-home and out-of-home appliances cannot be discriminated from each other.

If delays in transmission between the appliances shown in FIG. 1 are:

| | |
|---|---|
| a go-and-return delay in Ethernet: | 0.02 ms (milliseconds) |
| a go-and-return delay in the wireless medium (IEEE802.11b): | 3 ms |
| a delay in processing in router: | 0.5 ms |
| a go-and-return delay in the Internet: | 2 ms |

(when it is assumed that two routers exist in the route)

a processing delay in the receiving apparatus: 0.2 ms, the time required for transmission between the AV server 1 and each receiving apparatus (the go-and-return delay time in this case) is as shown below.

(Between the in-Home Appliances)

Digital Television Set 2

Transmission time $T1=0.02+0.02+0.2=0.24$ ms

PC 3

Transmission time $T2=0.02+3+0.2=3.22$ ms (Between the in-Home and Out-of-Home Appliances)

PC 6

Transmission time $T3=0.02+0.5\times 4+2+0.02+0.2=4.24$ ms

Digital Television Set 7

Transmission time $T4=0.02+0.5\times 4+2+3+0.2=7.22$ ms

The relationship between these values is as shown in FIG. 4. In this case, transmission between the in-home appliances can be determined from the transmission time T1 and transmission between the in-home and out-of-home appliances can be determined from the transmission time T4. From the transmission time T2 or T3, however, determination cannot be made as to whether transmission between the in-home appliances or transmission between the in-home and out-of-home appliances is being performed.

In this embodiment, therefore, a reference time 1 (Tth1=2 ms) for determination of transmission between the in-home appliances and a reference time 2 (Tth2=6 ms) for determination of transmission between the in-home and out-of-home appliances are set on the basis of the distribution of the number of appliances with respect to the transmission times in the case of transmission between the in-home appliances and the distribution of the number of appliances with respect to the transmission times in the case of transmission between the in-home and out-of-home appliances, as shown in FIG. 4, and measured transmission times are presumed and classified by being compared with the reference transmission times as to whether the receiving apparatus is an in-home appliance or an out-of-home appliance.

The operation when the AV server 1 receives an authentication request from some of the receiving apparatus will be described.

In this embodiment, AV data which needs copyright protection is an MPEG transport stream, which is reproduced from the contents recording section (not shown) of the AV server 1.

It is assumed that the AV server 1 has received no authentication request, the authentication count (SC) made by the authentication count section 24 is 0, and none of the device IDs for the appliances is stored in the device information storage means 27.

It is necessary for the digital television set 2 serving as a receiving apparatus to request the AV server 1 for authentication in order to receive and use the AV data stored in the AV server 1.

That is, the authentication request section 33 of the digital television set 2 outputs an authentication command for request of authentication to the transmission and reception section 31. The digital television set 2 is assigned a device ID from the key management center in advance. The AV server 1 can uniquely identify each of the appliances including the digital television set 2 by the device ID. The device ID of the digital television set 2 is attached to the authentication command output from the authentication request section 33.

The transmission and reception section 31 receives the authentication command, sets the IP address of the AV server 1 and a transmission destination port number and sends out the authentication command to the network.

The transmission and reception section 21 of the AV server 1 receives the authentication command from the digital television set 2 and outputs the received authentication command to the authentication processing section 23.

The authentication processing section 23 controls the transmission time measurement section 27 so that the transmission time measurement section 27 measures the time required for transmission between the AV server 1 and the device that has issued the authentication request. The transmission time measurement section 27 measures the transmission time.

Figure 5:
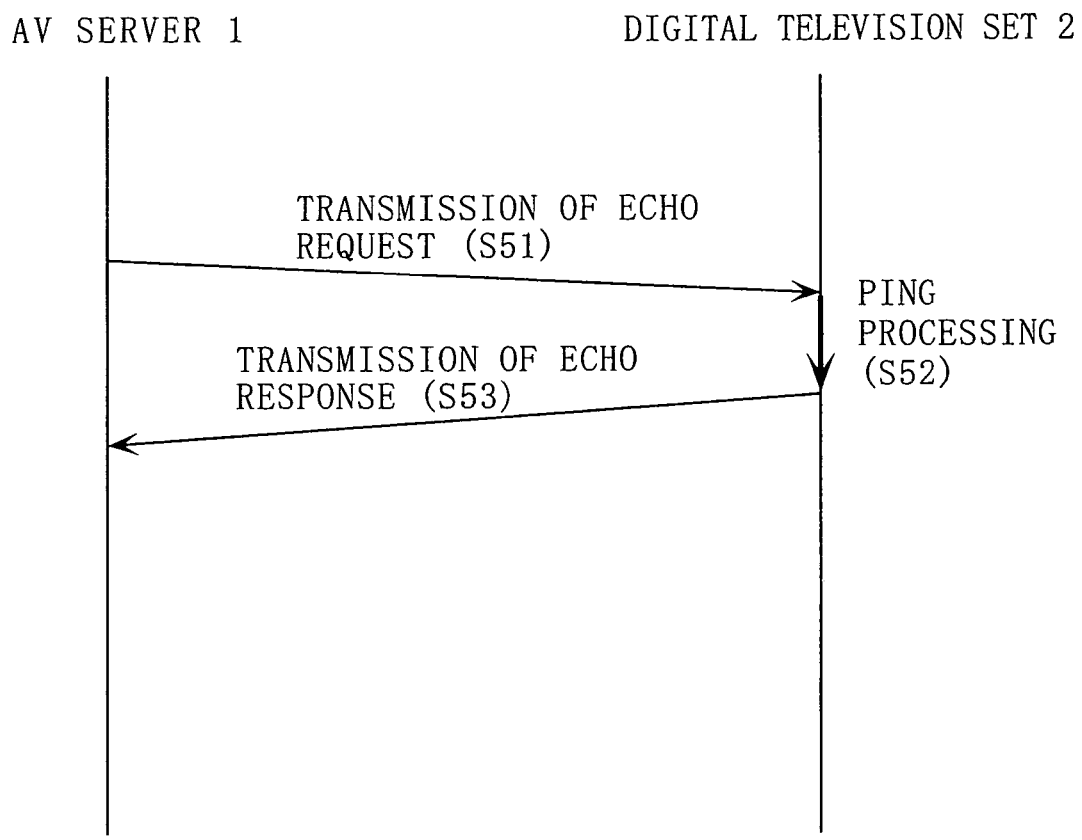
FIG. 5 is a diagram showing a processing sequence for measuring the transmission time in Embodiment 1 of the present invention.

FIG. 5 shows a transmission time measurement sequence. The transmission time measurement section 27 transmits an echo request packet as a packet for measurement of the transmission time to the digital television set 2 through the transmission and reception section 21 (S51). The transmission and reception section 31 of the digital television set 2 receives the echo request and sends the received request to the measurement packet processing section 35. The measurement packet processing section 35 forms an echo response packet (S52) and transmits the echo response packet to the AV server 1 through the transmission and reception section 31. The transmission time measurement section 27 receives the echo response through the transmission and reception section 21 and measures the go-and-return delay time as the transmission time from the difference between the moment at which the echo request is transmitted and the moment at which the echo request is received.

The transmission time measured by the transmission time measurement section 27 is output to the authentication count limitation section 25. The authentication count limitation section 25 compares the transmission time with the reference time 1 (Tth1) and the reference time 2 (Tth2) input from the reference time storage section 28, and classifies the transmission time by determining whether the transmission time is (a) equal to or shorter than the reference time 1 (Tth1) (b) longer than the reference time 1 (Tth1) and equal to or shorter than the reference time 2 (Tth2) or (c) longer than the reference time 2 (Tth2), and set limitation parameters for limiting the authentication count on the basis of this classification.

Figure 6:
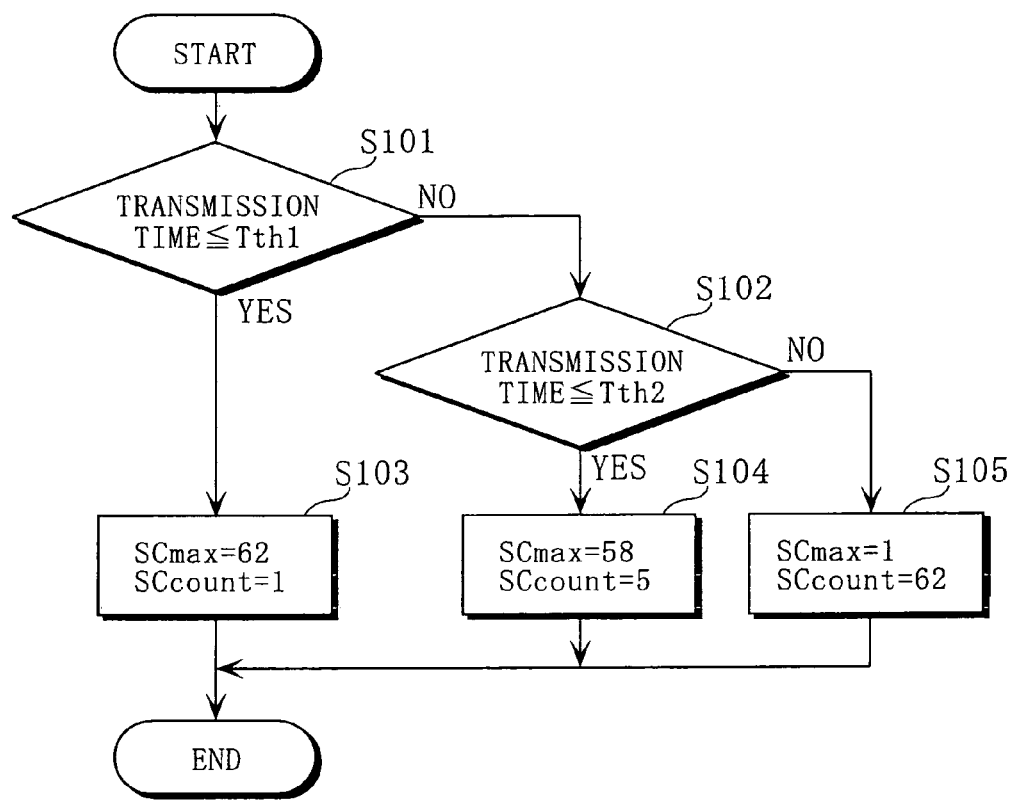
FIG. 6 is a flowchart at the time of setting of authentication count limitation parameters on the basis of the result of classification of the transmission time in Embodiment 1 of the present invention.

FIG. 6 is a flowchart showing a process in which the authentication count limitation section 25 sets authentication limitation parameters.

The authentication count limitation section 25 classifies the transmission time by comparison with the reference time 1 (Tth1) and the reference time 2 (Tth2) (S101, S102), and sets the maximum value SCmax of the authentication count and the count increment value SCcount in the authentication count section 24 according to the classification result (S103, S104, S105). In this embodiment, the set values with respect to ranges of transmission time are as shown below.

In the case of the range (a) of transmission time in which the transmission time is equal to or shorter than Tth1

SCmax=62, SCcount=1

In the case of the range (b) of transmission time in which the transmission time is longer than Tth1 and equal to or shorter than Tth2

SCmax=58, SCcount=5

In the case of the range (c) of transmission time in which the transmission time is longer than Tth2

SCmax=1, SCcount=62

In this processing, the AV server 1 measures the time (T1) required for transmission between the AV server 1 and the in-home digital television set 2. Since T1<Tth1 as shown in FIG. 4, the values in the above-described case (a) are set.

The limitation condition updating section 30 is a means of updating the above-described parameters, i.e., the reference times Tth1 and Tth2 and the values of the limitation parameters SCmax and SCcount, by receiving externally-supplied updating data through the transmission and reception section 21. When the limitation condition updating section 30 receives the data, it updates the above-described parameters and the authentication count limitation section 25 and the reference time storage section 28 thereafter operate according to the updated parameters.

The authentication count limitation section 25 determines whether authentication should be executed or the authentication request should be refused on the basis of the reference time, the limitation parameters, the authentication count (SC) by the authentication count section 24 and the device ID of the digital television set 2 notified from the authentication processing section 27, and outputs the result of this determination to the authentication processing section 23. The authentication processing section 23 receives the determination result and executes authentication or refuses the authentication request.

Figure 7:
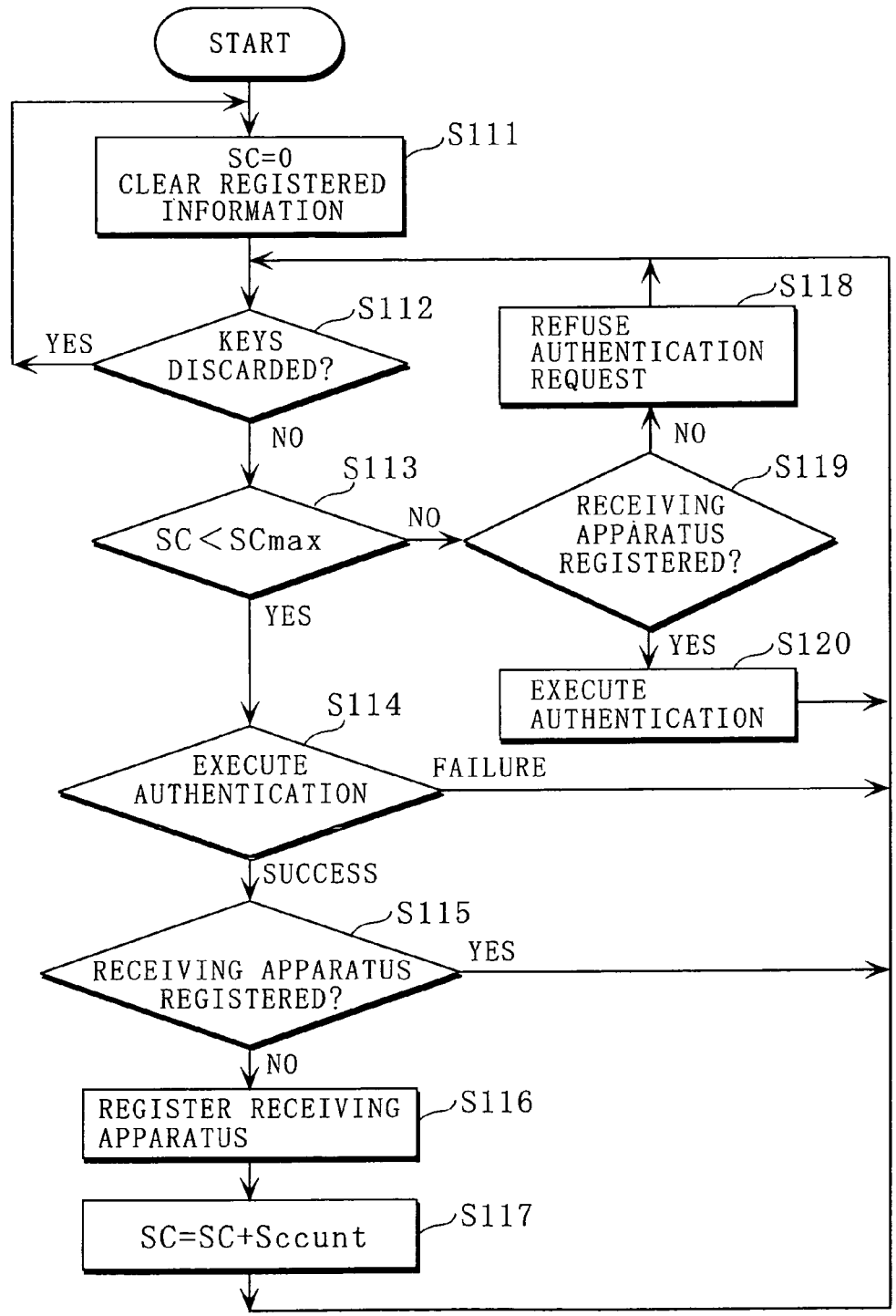
FIG. 7 is a flowchart at the time of authentication execution determination and execution of authentication conducted by an authentication count limitation section in Embodiment 1 of the present invention.

FIG. 7 is a flowchart showing the operation at the time of authentication execution determination by the authentication count limitation section 25 and execution of authentication.

First, the authentication count limitation section 25 initializes the authentication count (SC) in the authentication count section 24 (S111) and checks keys to be exchanged in the case of success in authentication (S112). If the keys are discarded, the process returns to step S111. If the keys are not discarded, the authentication count limitation section 25 compares SC with SCmax (S113). If SC<SCmax, the process advances to step S114. In the other case, the process moves to step S119.

In S114, the authentication count limitation section 25 outputs the determination result as authentication execution permission to the authentication processing section 23 to make the same to execute authentication. If authentication results in success, the process advances to step S115. If authentication results in failure, the process moves to step S112. In step S115, the authentication count limitation section 25 checks whether or not the device ID of the appliance that has made the authentication request has been registered in the device information registration section 26. If the corresponding device ID has been registered, there is no need to increment SC and, therefore, the process returns to step S112. If the device ID has not been registered, the authentication count limitation section 25 registers the device ID of the receiving apparatus in the device information registration section 26 (S116), and increments the authentication count SC in the authentication count section 24 by SCcount (S117).

In step S119, a check is made as to whether or not the device ID of the appliance that has made the authentication request has been registered in the device information registration section 26. If the device ID has been registered, authentication is executed (S120). If the device ID has not been registered, the authentication request is refused and the process returns to step S112.

Since this description is made of the case where the AV server 1 has received an authentication request from the digital television set 2, the authentication count limitation conditions set on the basis of the transmission time are SCmax=62 and SCcount=1 as described above. At this point in time, therefore, authentication is executed without limitation by the authentication count. The authentication count SC after execution of authentication is 1.

In this case, since the transmission time T1 is classified into the range of transmission time for transmission between the in-home appliances, the maximum value of the authentication count and the count increment value are SCmax=62 and SCcount=1, which are ordinary values in authentication of the in-home appliances.

When authentication results in success, the authentication processing section 23 of the AV server 1 delivers to the encryption processing section 22 the key exchanged by authentication in cooperation with the authentication processing section 34 of the digital television set 2. The encryption processing section 22 encrypts the AV data with the key delivered by the authentication processing section 23 and outputs the encrypted data to the transmission and reception section.

On the other hand, in the case of success in authentication, the authentication processing section 34 of the digital television set 2 outputs the key exchanged by authentication to the decryption processing section 32. The decryption processing section 32 decrypts the AV data transmitted from the AV server 1 with the key received from the authentication processing section 34. The decrypted plain-text AV data is decoded by the decoder (not shown), converted into an analog signal and displayed on the monitor.

In this embodiment, the time to live setting section 29 of the transmitting apparatusets transmission time (TTL)=4 and transmits the authentication command and the AV data, and the transmission and reception section 31 of the receiving apparatus checks the authentication command and the time to live of the AV data and, if the time to be live exceeds 4, determines that the time to live has been altered and discards the received data.

In the above-described operation, if the digital television set 2 is an authenticated appliance and if authentication results in success without limitation by the authentication count, the authentication processing section 23 of the AV server 1 and the authentication processing section 34 of the digital television set 2 exchange the keys for encrypting and decrypting the AV data. In the case of success in authentication, therefore, the digital television set 2 can decrypt the cryptogram of the AV data transmitted from the AV server 1 by using the obtained key and decode the decrypted data to display images and output sounds.

If the digital television set 2 is an unauthenticated appliance or if authentication results in failure due to limitation by the authentication count, the above-described key exchange is not performed. In this case, therefore, the digital television set 2 cannot decrypt the cryptogram even if it receives the AV data from the AV server 1, and cannot display images and output sounds even if it decodes the AV data.

The operation in a case where the AV server 1 successively receives an authentication request from the PC 6 existing as an out-of-home appliance will be described.

When the AV server 1 receives the authentication command from the PC 6, the transmission time measurement section 27 measures the time required for transmission between the AV server 1 and the appliance that has issued the authentication request. The authentication count limitation section 28 compares the transmission time with the reference time 1 (Tth1) and the reference time 2 (Tth2) and classifies the transmission time into one of the above-described ranges (a), (b) and (c) of transmission time.

The transmission time T3 in this case is longer than Tth1 and equal to or shorter than Tth2. The transmission time T3 therefore belongs to the range (b) of transmission time. The authentication count limitation parameters are SCmax=58 and SCcount=5. Authentication is executed and the authentication count SC after execution of authentication is SC=1+5=6.

In this case, the range into which the transmission time T3 is classified is such that there is a possibility of the authenticated appliance being an out-of-home appliance. Therefore, the authentication count SC is incremented by the amount corresponding to 5 appliances, so that the maximum authentication count is smaller than that in the case where all the appliances are in-home appliances.

The operation in a case where the AV server 1 successively receives an authentication request from the digital television set 7 existing as an out-of-home appliance will be described.

When the AV server 1 receives the authentication command from the digital television set 7, the transmission time measurement section 27 measures the time required for transmission between the AV server 1 and the appliance that has issued the authentication request. The authentication count limitation section 28 compares the transmission time with the reference time 1 (Tth1) and the reference time 2 (Tth2) and classifies the transmission time.

The transmission time T4 in this case is longer than Tth2. The transmission time T4 therefore belongs to the range (c) of transmission time. The authentication count limitation parameters are SCmax=1 and SCcount=62. At this point in time, the authentication count SC=6 and SC>SCmax. Therefore, the authentication request is refused.

In this case, since the transmission time T4 is classified into the range of transmission time related to the out-of-home appliances, the digital television set 7 is not authenticated unless authentication count SC can be incremented by the amount corresponding to 62 appliances, that is, SC=0. If authentication is executed in such a situation, SC=62 is set upon authentication. Thereafter, authentication is not executed even when an authentication request is newly received, regardless of whether the appliance making the request corresponds to the range (a), (b) or (c) of transmission time.

The operation in a case where the AV server 1 successively receives an authentication request from the PC 3 existing as an in-home appliance will be described.

When the AV server 1 receives the authentication command from the PC 3, the transmission time measurement section 27 measures the time required for transmission between the AV server 1 and the appliance that has issued the authentication request. The authentication count limitation section 28 compares the transmission time with the reference time 1 (Tth1) and the reference time 2 (Tth2) and classifies the transmission time.

The transmission time T2 in this case is longer than Tth1 and equal to or shorter than Tth2. Accordingly, the authentication count limitation parameters are SCmax=58 and SCcount=5. At this point in time, the authentication count SC=6 and SC<SCmax. Therefore, authentication is executed. The authentication count SC after execution of authentication is SC=11.

In this case, the PC 3 is an in-home appliance but the transmission time T2 is long and the range (b) of transmission time into which the transmission time T2 is classified is such that there is a possibility of the authenticated appliance being an out-of-home appliance. Therefore, the authentication count SC is incremented by the amount corresponding to 5 appliances, so that the maximum authentication count is smaller than that in the ordinary case.

As described above, in the copyright protection system of this embodiment, AV data which needs copyright protection is transmitted after being encrypted; unauthorized appliances are excluded by performing authentication; and the authentication count limitation conditions are changed according to the transmission time to reduce the maximum authentication count at the time of authentication of an appliance probable to exist outside a home or an appliance recognized as an appliance existing outside the home, thus managing use of the AV data by limiting distribution of the AV data to unspecified out-of-home appliances.

Also, the copyright protection system of this embodiment has the limitation condition updating section 30 which updates parameters relating to the authentication count limitation conditions and is therefore capable of updating the limitation conditions in a case where a need arises to change the reference times for classification of the transmission time, the maximum value of the authentication count, and so on due to a change in the network environment or the like to enable limitation of the authentication count under suitable limitation conditions.

This embodiment has been described with respect to a case where there are four receiving apparatus. However, any other number of receiving apparatus may be connected.

Media in accordance with Ethernet and IEEE802.11b have been described as network transmission media in this embodiment. However, any of other media such as those in accordance with IEEE802.11a, Bluetooth, etc., may also be used.

This embodiment has been described with respect to a case where transmission times are classified into three ranges of transmission time on the basis of two reference times. However, classification of transmission times is not limited to this. Transmission times may be classified into two ranges of transmission time on the basis of one reference time, e.g., Tth1 (2 ms). Further, a reference time Tth3 (10 ms) may be added to set three or more reference times and transmission times may be classified into four or more ranges of transmission time.

A method of setting reference times in advance by examining the distribution of the number of appliances with respect to the transmission time in the case of transmission between in-home appliances and transmission between in-home and out-of-home appliances under various conditions has been described by way of example in the description of this embodiment. However, this method of determining reference times is not exclusively used. For example, the transmission medium may be limited to a particular transmission medium in accordance with Ethernet or the like and reference times may be set by examining transmission times under this condition.

In this embodiment, a parameter relating to the limitation conditions, the value (1, 5, 62) set in SCcount is only an example, and any other value may be set.

An arrangement in which at least one receiving apparatus can be authenticated even if the receiving apparatus has a transmission time belonging to the range (c) of transmission time and longer than all the reference times has been described by way of example in the description of this embodiment. However, the limitation conditions may be set so that an authentication request is refused without exception if the transmission time belongs to the range of transmission time longer than all the reference times.

This embodiment has been described with respect to a case where the limitation condition updating section 30 receives updating data via a network. Alternatively, the limitation condition updating section 30 may receive updating data by using a different means such as a removable medium or downloading through a broadcast.

This embodiment has been described with respect to a case where the device information registration section 26 in which device information about receiving apparatus is registered is provided and the authentication count is not made when processing according to an authentication request from one of the registered receiving apparatus is executed. However, the arrangement may alternatively be such that the device information registration section 26 is removed and authentication count is made always when processing according to an authentication request is executed.

In this embodiment, measurement of go-and-return delay time is performed as a method of measuring the transmission time. Alternatively, the transmission delay time of transmission through only one of the going and returning paths may be measured.

This embodiment has been described with respect to a case where transmission time measurement is performed only one time. Alternatively, the transmission time maybe measured a certain number of times and the minimum or the average of the measured values may be selected as the transmission time.

In this embodiment, transmission time measurement is executed every time an authentication request is sent from one of the receiving apparatus. Alternatively, transmission time measurement may be executed with respect to the initial authentication request from each receiving apparatus, or an additional procedure for registering receiving apparatus in the transmitting apparatus may be provided and the transmission time may be measured at the time of registration.

Embodiment 2

<Outline>

A copyright protection system in Embodiment 2 has a reference time setting means of measuring the transmission time required for transmission of information for measurement over each of predetermined reference routes and setting reference times on the basis of the measurement results.

<Configuration>

A transmitting apparatus and receiving apparatus constituting the copyright protection system of this embodiment are arranged as shown in FIG. 1, as are those in Embodiment 1.

Figure 8:
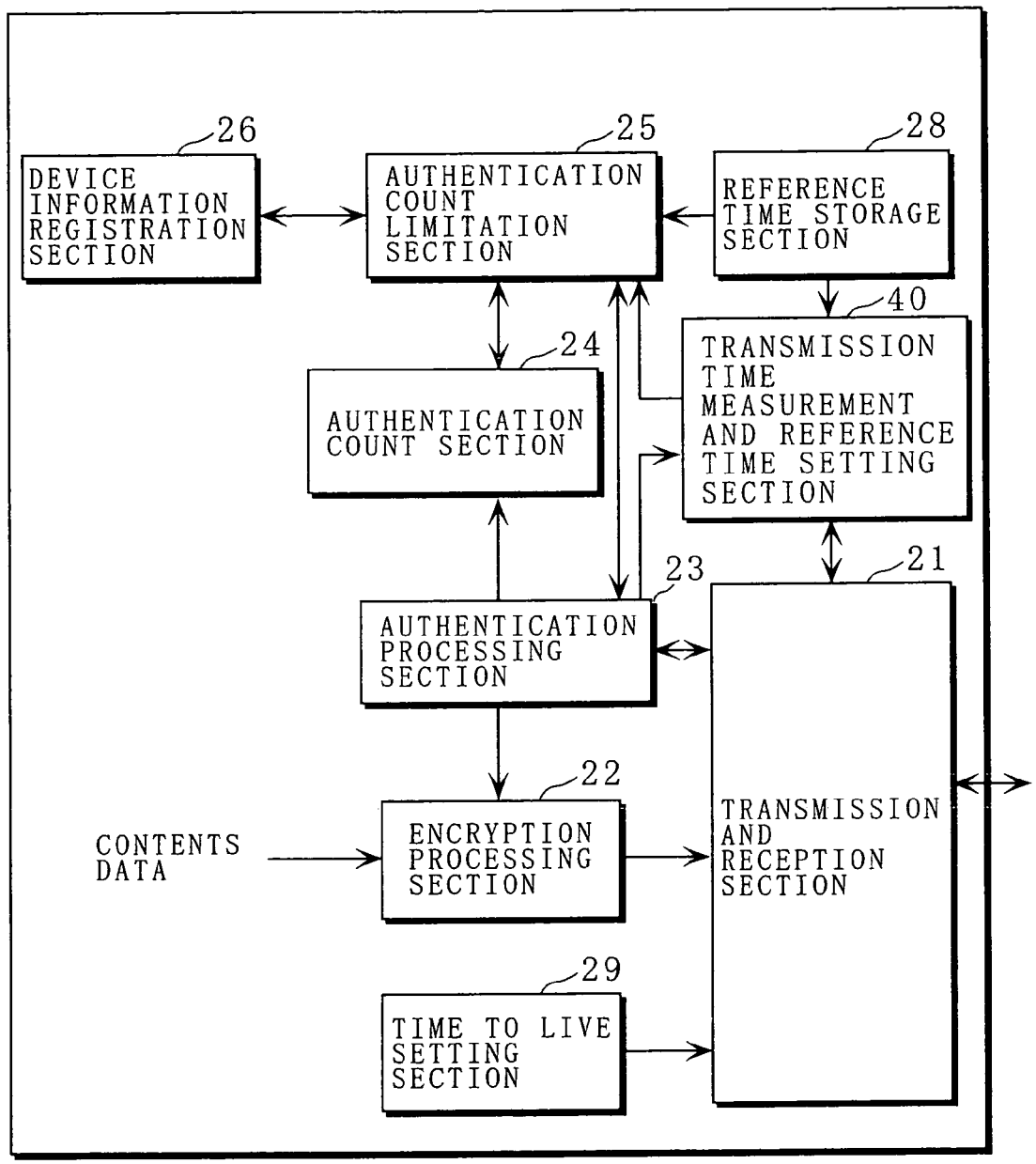
FIG. 8 is a diagram showing the configuration of an AV server in Embodiment 2 of the present invention.

FIG. 8 shows the configuration of an AV server 1 representing the transmitting apparatus of this embodiment.

In FIG. 8, the same components as those in the AV server 1 described with reference to FIG. 2 in Embodiment 1 are indicated by the same reference numerals. The configuration of the AV server 1 of this embodiment differs from that in Embodiment 1 in that the transmission time measurement section 27 in Embodiment 1 is replaced with a transmission time measurement and reference time setting section 40 and in that the limitation condition updating section 30 is not provided. In other respects, the configuration in this embodiment is the same as that in Embodiment 1.

The transmission time measurement and reference time setting section 40 measures the transmission time required for transmission between the AV server 1 and one of the receiving apparatus which has transmitted an authentication request, measures the transmission time required for transmission over a predetermined reference route, sets reference times on the basis of the results of these measurements, and outputs the reference times to the reference time storage section 28.

The configuration of receiving apparatus in this embodiment is as shown in FIG. 3, as is that in Embodiment 1.

In the above-described arrangement, the transmission time measurement and reference time setting section 40 corresponds to the transmission time measurement means and the reference time setting means of the present invention.

<Operation>

The operation of the AV server 1 in this embodiment differs from that in Embodiment 1 in the method of setting reference time 1 and reference time 2 and in limitation condition updating operation. In other respects, the operation of the AV server 1 in this embodiment is the same as that in Embodiment 1.

The method of setting reference time 1 and reference time 2 in this embodiment will be described.

Figure 9:
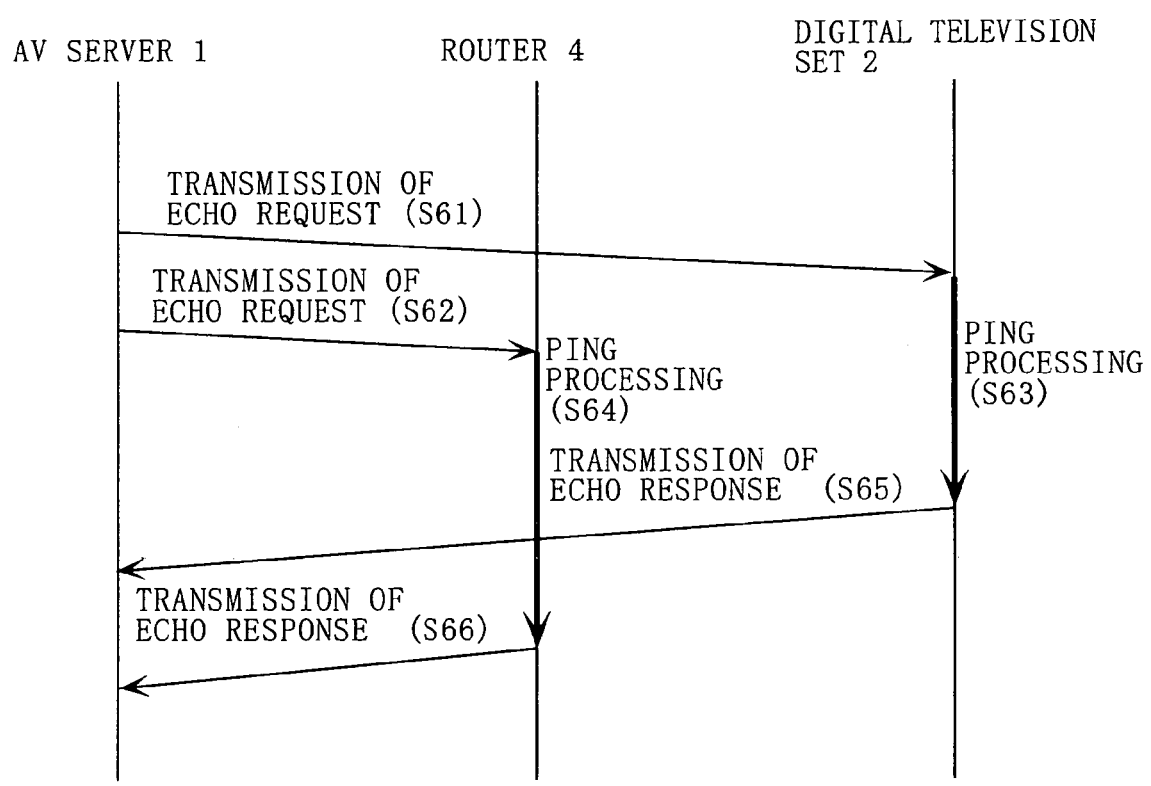
FIG. 9 is a diagram showing a processing sequence for measuring the transmission time in Embodiment 2 of the present invention.

FIG. 9 shows a transmission time measurement sequence in this embodiment.

The transmission time measurement and reference time setting section 40 first transmits an echo request packet as a packet for measurement of the transmission time to the digital television set 2 (S61) and to the router 4 (S62) through the transmission and reception section 21.

When the transmission and reception section 31 of the digital television set 2 receives an echo request, it transmits the echo request to the measurement packet processing section 35. The measurement packet processing section 35 forms an echo response packet (S63) and transmits the echo response packet to the AV server 1 through the transmission and reception section 31. The transmission time measurement and reference time setting section 40 receives the echo response packet through the transmission and reception section 21 and measures the transmission time (go-and-return delay time in this embodiment) from the difference between the moment at which the echo request is transmitted and the moment at which the echo request is received (S65).

The router 4 receives the echo request, forms an echo response packet (S64) and transmits the echo response packet to the AV server 1. The transmission time measurement and reference time setting section 40 receives the echo response packet through the transmission and reception section 21 and measures the transmission time (go-and-return delay time in this embodiment) from the difference between the moment at which the echo request is transmitted and the moment at which the echo request is received (S65).

The transmission time measurement and reference time setting section 40 sets reference time 1 (Tth1) and reference time 2 (Tth2) by multiplying the transmission time required for transmission between the AV server 1 and the router 4 by a predetermined coefficient, and outputs the reference times to the reference time storage section 28. The transmission time measurement and reference time setting section 40 outputs to the authentication count limitation section 25 the measured transmission time of transmission to and from the digital television set 2. The authentication count limitation section 25 compares the transmission time to and from the digital television set 2 with the reference time 1 and the reference time 2, classifies the transmission time with respect to ranges of transmission time, and set parameters for limiting the authentication count.

Thus, in the copyright protection system of this embodiment, reference times are set on the basis of the result of measurement of the transmission time required for transmission of information for measurement over a predetermined reference route and, therefore, the reference times for determination as to whether transmission between in-home appliances or transmission between in-home and out-of-home appliances is being performed can be automatically set according to actual home network conditions. Therefore, the copyright protection system of this embodiment has effects specific to this embodiment, i.e., the effects of making determination more accurately as to whether a recognized appliance is an in-home appliance or an out-of-home appliance according to the transmission time and eliminating the need for manually setting the reference times with respect to changes in the network environment, as well as the effect of limiting distribution to unspecified out-of-home appliances.

In this embodiment, the route to the router in the home network is selected as a predetermined reference route. However, a route to some other appliance may alternatively be set or a plurality of reference routes may be set.

In this embodiment, measurement of go-and-return delay time is performed as a method of measuring the transmission time. Alternatively, the transmission delay time of transmission through only one of the going and returning paths may be measured.

Embodiment 3

<Outline>

A copyright protection system in Embodiment 3 has a range-by-range authentication count means of making the authentication count with respect to each of ranges of transmission time as well as the authentication count means that counts the total authentication count, and limits authentication so that the authentication count with respect to each range of transmission time does not exceed the maximum value set with respect to the range of transmission time.

<Configuration>

A transmitting apparatus and receiving apparatus constituting the copyright protection system of this embodiment are arranged as shown in FIG. 1, as are those in Embodiment 1.

The configuration of an AV server 1 representing the transmitting apparatus in this embodiment is as shown in FIG. 2, as is that in Embodiment 1.

The configuration of receiving apparatus in this embodiment is as shown in FIG. 3, as is that in Embodiment 1.

<Operation>

The operation of the AV server 1 in this embodiment differs from that in Embodiment 1 in the method of authentication count limitation in the authentication count limitation section 25. In other respects, the operation of the AV server 1 in this embodiment is the same as that in Embodiment 1.

The authentication count limitation method in this embodiment will be described.

Figure 10:
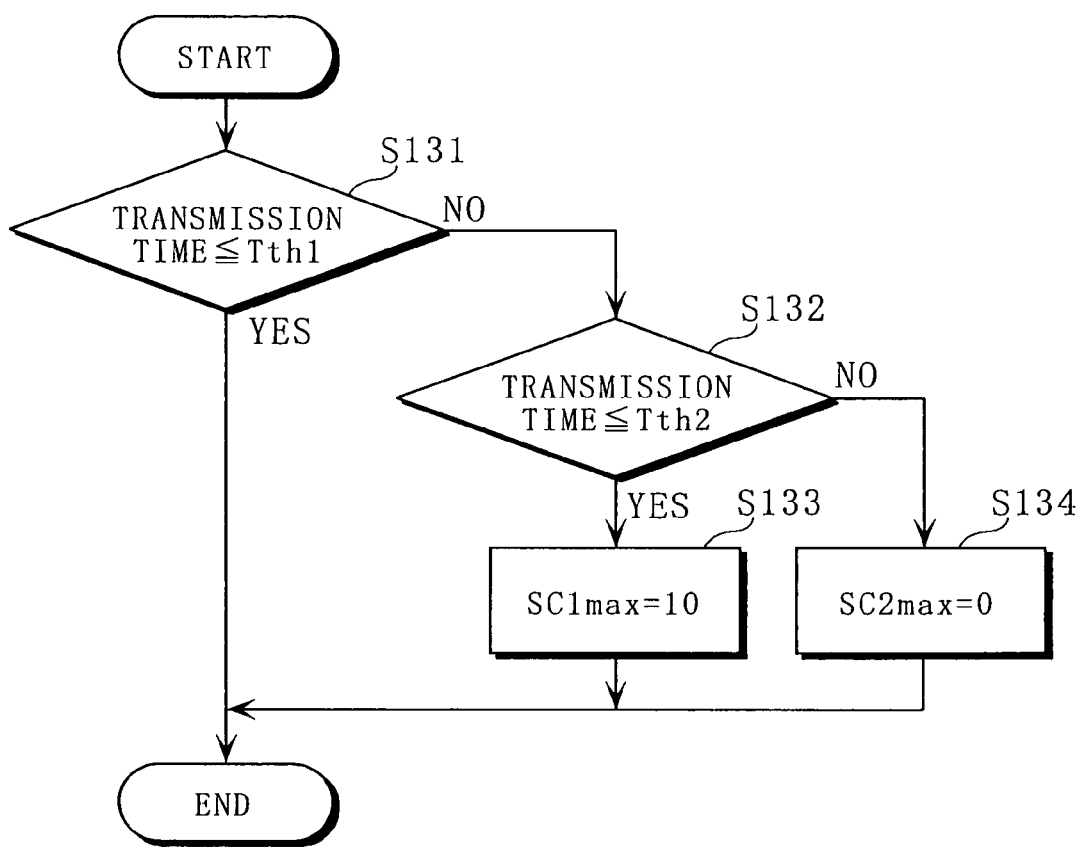
FIG. 10 is a flowchart at the time of setting of authentication count limitation parameters on the basis of the result of classification of the transmission time in Embodiment 3 of the present invention.

FIG. 10 is a flowchart showing a process in this embodiment in which the authentication count limitation section 25 sets authentication count limitation parameters.

The authentication count limitation section 25 compares the transmission time with reference time 1 (Tth1) and reference time 2 (Tth2), classifies the transmission time with respect ranges of transmission time (S131, S132) and sets SC1max and SC2max as authentication count maximum values with respect to the ranges of transmission time (S133, S134). The set values are as described below.

With respect to the range (d) of transmission time in which the transmission time is longer than Tth1 and equal to or shorter than Tth2

$$SC1max=10$$

With respect to the range (e) of transmission time in which the transmission time is longer than Tth2

$$SC2max=0$$

Figure 11:
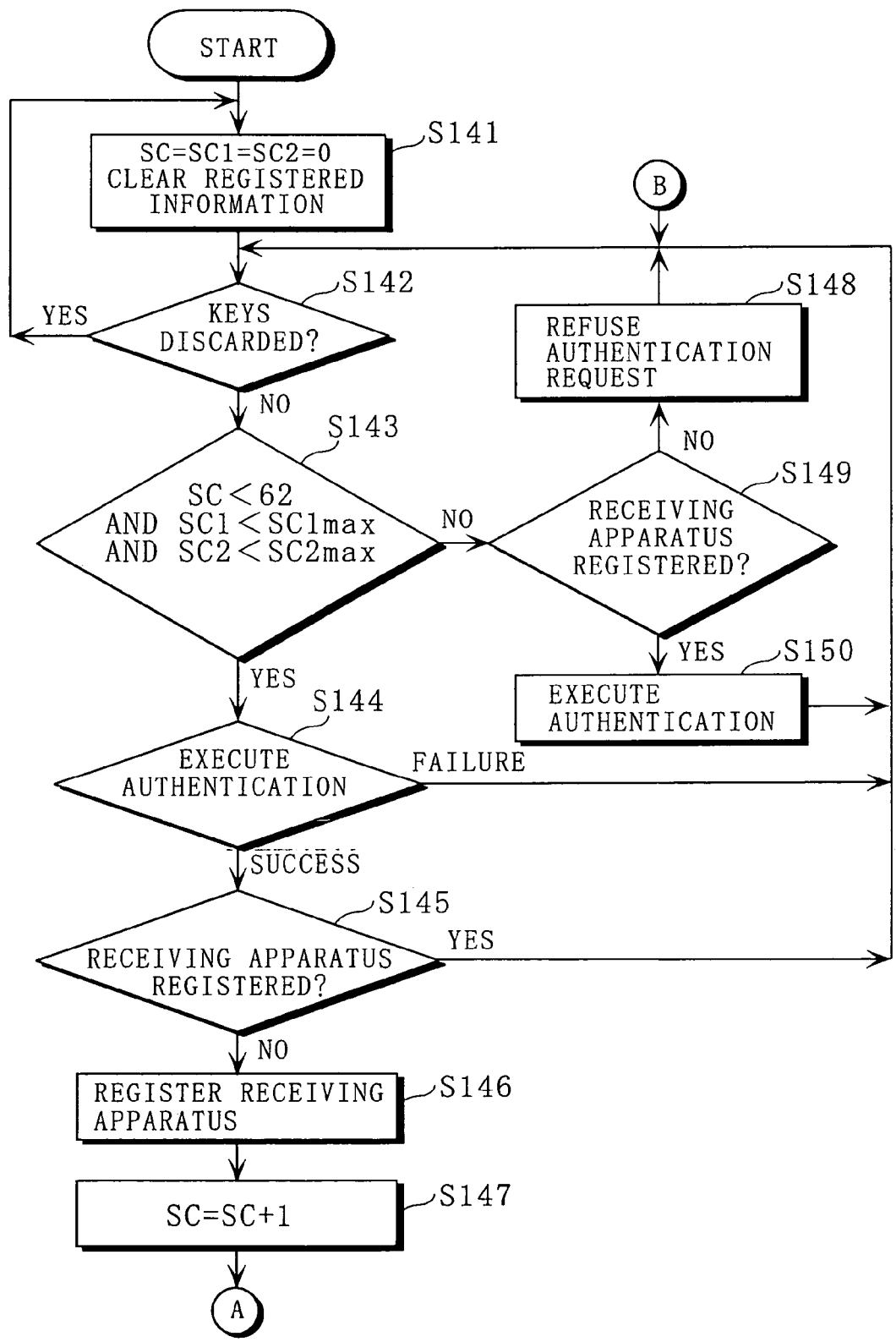
FIG. 11 is a portion of a flowchart at the time of authentication execution determination and execution of authentication conducted by the authentication count limitation section in Embodiment 3 of the present invention.
Figure 12:
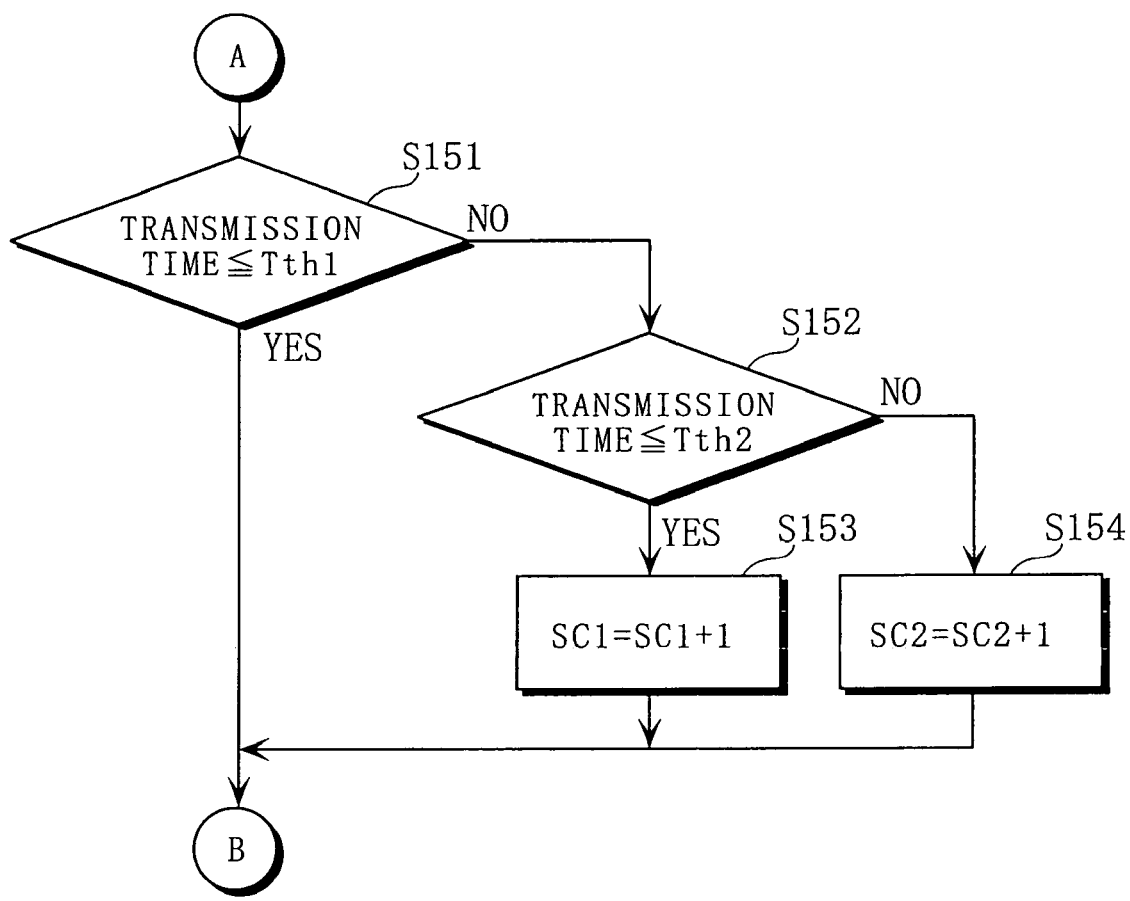
FIG. 12 is another portion of the flowchart at the time of authentication execution determination and execution of authentication conducted by the authentication count limitation section in Embodiment 3 of the present invention.

FIGS. 11 and 12 are flowcharts showing the operation at the time of authentication execution determination by the authentication count limitation section 25 and execution of authentication.

First, the authentication count limitation section 25 initializes the authentication count (SC) and authentication counts (SC1, SC2) with respect to ranges of transmission time in the authentication count section 24 (S141) and checks keys to be exchanged in the case of success in authentication (S142). If the keys are discarded, the process returns to step S141. If the keys are not discarded, the authentication count limitation section 25 compares SC, SC1 and SC2 with SCmax, SC1max and SC2max (S143). If SC<SCmax, SC1<SC1max and SC2<SC2max, the process advances to step S144. In the other case, the process moves to step S149.

In step S144, the authentication count limitation section 25 outputs the determination result as authentication execution permission to the authentication processing section 23 to make the same to execute authentication. If authentication results in success, the process advances to step S145. If authentication results in failure, the process moves to step S142. In step S145, the authentication count limitation section 25 checks whether or not the device ID of the appliance that has made the authentication request has been registered in the device information registration section 26. If the corresponding device ID has been registered, there is no need to increment SC and, therefore, the process returns to step S142. If the device ID has not been registered, the authentication count limitation section 25 registers the device ID of the receiving deice in the device information registration section 26 (S146), and increments the authentication count SC in the authentication count section 24 by +1 (S147).

Subsequently, the authentication count limitation section 25 checks the transmission time (S151, S152) (FIG. 12), increments SC1 by +1 if the transmission time is longer than Tth1 and equal to or shorter than Tth2, that is, it falls into the range (d) of transmission time, and increments SC2 by +1 if the transmission time is longer than Tth2, that is, it falls into the range (e) of transmission time. The process then returns to step S142.

In step S149, a check is made as to whether or not the device ID that has made the authentication request has been registered in the device information registration section 26. If the device ID has been registered, authentication is executed (S150). If the device ID has not been registered, the authentication request is refused and the process returns to step S142.

In a case where the AV server 1 receives an authentication request from the digital television set 7, the transmission time is T4 and longer than Tth2, as described above in the description of Embodiment 1. In this case, therefore, limitation of the authentication count according to the authentication count SC2 with respect to the range of transmission time and the maximum value SC2max of the authentication count is effected. Since SC2max=0 is set in this embodiment, the authentication request is refused even when the total authentication count is not larger than 62.

In a case where the AV server 1 receives an authentication request from the PC 6, the transmission time is T3 and falls into the range (d) of transmission time, as described above in the description of Embodiment 1. In this case, therefore, limitation of the authentication count according to the authentication count SC1 with respect to the range of transmission time and the maximum value SC1max of the authentication count is effected. Since SC1max=10 in this embodiment, authentication up to the authentication count 10 is permitted for the receiving apparatus with respect to this range if the total authentication count SC is not larger than 52.

Thus, in the copyright protection system of this embodiment, the authentication count section 24 makes the authentication count with respect to each of ranges of transmission time for classification of transmission times instead of counting the total authentication count in the entire system, and the authentication count with respect to each range of transmission time is limited so as not to exceed a predetermined maximum value, thereby enabling the authentication count when the transmission time exceeds one of the reference times to be individually set and limited with respect to each range of transmission time. Thus, the copyright protection system of this embodiment has an effect specific to this embodiment, i.e., the effect of individually managing the authentication count with respect to each range of transmission time when one of the reference times is exceeded, as well as the effect of limiting distribution to unspecified out-of-home appliances.

This embodiment has been described with respect to a case where the transmission time is classified on the basis of two reference times. Alternatively, classification may be performed on the basis of one reference time, or three or more reference times may be set.

This embodiment has been described with respect to a case where the request of authentication of receiving apparatus for which a transmission time longer than the reference time 2 is required is refused without exception. However, the limitation conditions may be set so as to permit authentication up to a predetermined authentication count maximum value even when transmission time is longer than the reference time 2.

In this embodiment, the total authentication count means is provided for management of the maximum value of the authentication count. Alternatively, authentication count means may be provided with respect to each range of transmission time to eliminate the need for the total authentication count means.

Embodiment 4

<Outline>

A copyright protection system in Embodiment 4 has an attribute information management means of managing attribute information about contents, and changes authentication count limitation conditions on the basis of the results of transmission time classification and the attribute information about contents.

<Configuration>

A transmitting apparatus and receiving apparatus constituting the copyright protection system of this embodiment are arranged as shown in FIG. 1, as are those in Embodiment 1.

Figure 13:
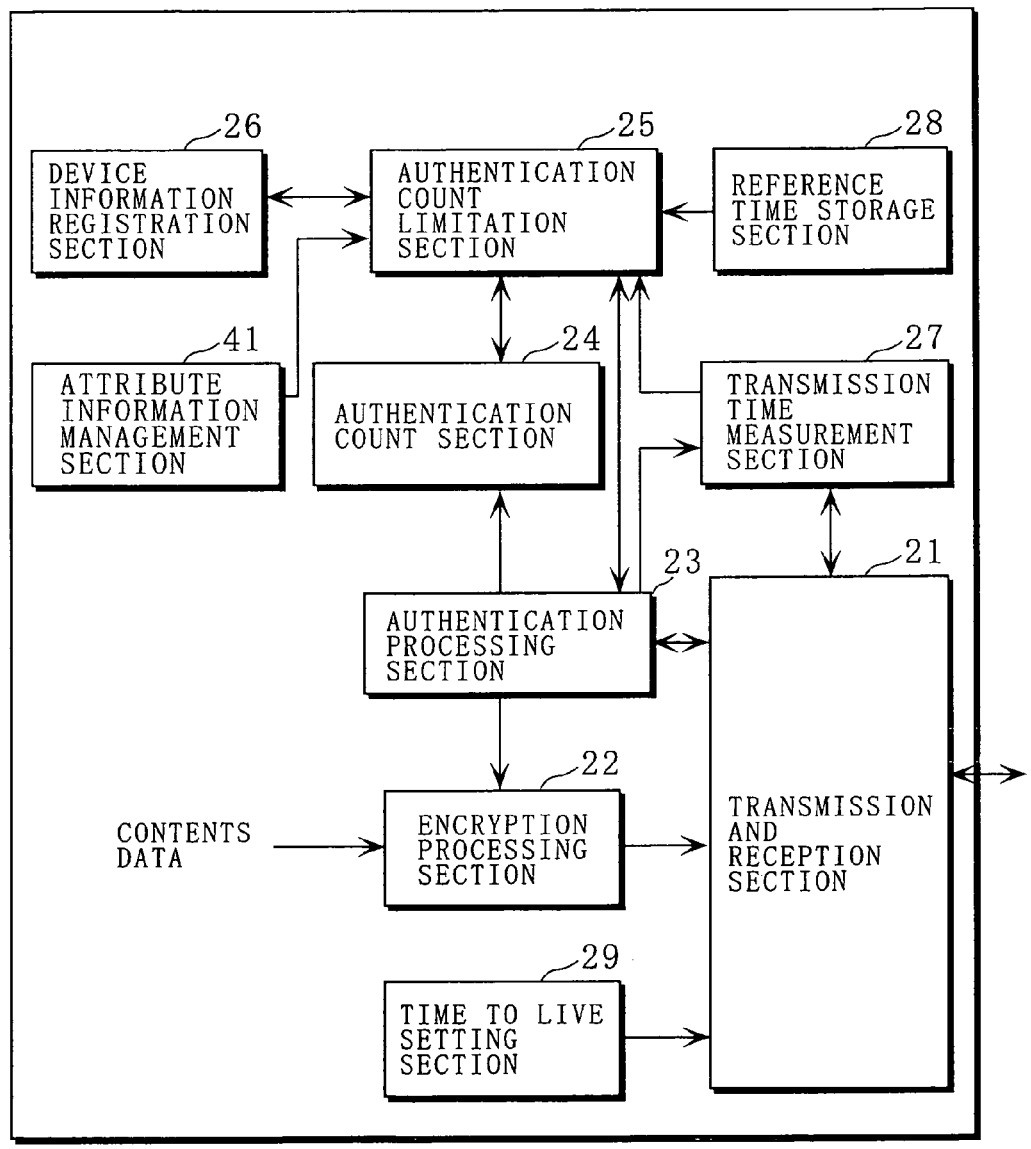
FIG. 13 is a diagram showing the configuration of an AV server in Embodiment 4 of the present invention.

FIG. 13 is a diagram showing the configuration of an AV server 1 representing the transmitting apparatus of this embodiment.

In FIG. 13, the same components as those in the AV server 1 described with reference to FIG. 2 in Embodiment 1 are indicated by the same reference numerals. The configuration of the AV server 1 of this embodiment differs from that in Embodiment 1 in that an attribute information management section 41 is provided while the limitation condition updating section 30 is not provided. In other respects, the configuration in this embodiment is the same as that in Embodiment 1.

The attribute information management section 41 manages attribute information about contents and outputs to the authentication count limitation section 25 copy control information as information on attributes of a content transmitted according to a request from the authentication count limitation section 25.

The configuration of receiving apparatus in this embodiment is as shown in FIG. 3, as is that in Embodiment 1.

In the above-described arrangement, the attribute information management section 41 corresponds to the attribute information management means of the present invention.

<Operation>

The operation of the AV server 1 in this embodiment differs from that in Embodiment 1 in that the authentication count limitation method by the authentication count limitation section 25 comprises setting authentication count limitation conditions by means of referring to attribute information obtained from the attribute information management section 41. In other respects, the operation of the AV server 1 in this embodiment is the same as that in Embodiment 1.

Figure 14:
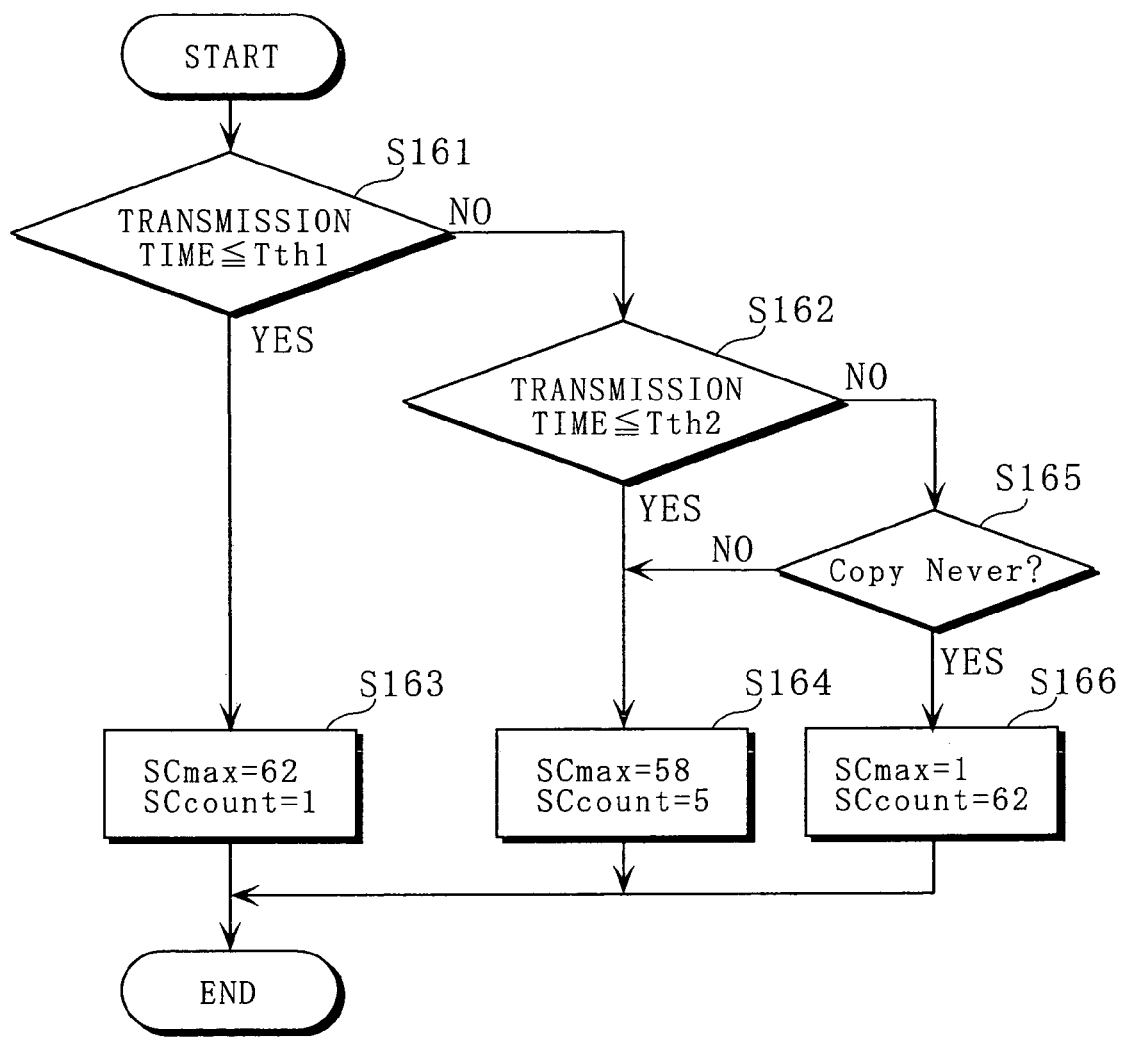
FIG. 14 is a flowchart at the time of setting of authentication count limitation parameters on the basis of the result of classification of the transmission time in Embodiment 4 of the present invention.

FIG. 14 is a flowchart showing a process in this embodiment in which the authentication count limitation section 25 sets authentication count limitation parameters.

The authentication count limitation section 25 compares the transmission time with reference time Tth1 (S161), sets SCmax=62 and SCcount=1 if the transmission time is equal to or shorter than Tth1 (S163), compares the transmission time with reference time Tth2 if the transmission time is longer than Tth1 (S162), and sets SCmax=58 and SCcount=5 if the transmission time is equal to or shorter than Tth2 (S164).

If the transmission time is longer than reference time Tth2, the authentication count limitation section 25 checks copy control information about a content obtained as attribute information about contents from the attribute information management section 41 (S165), sets SCmax=1 and SCcount=62 in step S166 if the information is "Copy Never", and sets SCcount=5 in step S164 if the information is not "Copy never".

The authentication count limitation section 25 conducts execution of processing according to an authentication request or refusal of the authentication request under the limitation conditions shown above.

In a case where the AV server 1 receives an authentication request from the digital television set 7, the transmission time is T4 and longer than Tth2, and falls into the range (c) of transmission time shown above, as described above in the description of Embodiment 1. However, if the copy control information about the content is not "Copy Never", authentication count limitation processing is performed by using the same limitation parameters as those in the case of the range (b) of transmission time.

On the other hand, if the copy control information about the content is "Copy Never", SCmax=1 and SCcount=62 are used, the authentication count SC is 1 at the maximum and authentication requests from the other receiving apparatus are refused once authentication is executed.

Thus, the copyright protection system of this embodiment is capable of setting authentication count limitation conditions on the basis of the result of classification of the transmission time and attribute information about the content. Therefore, the copyright protection system of this embodiment has an effect specific to this embodiment, i.e., the effect of limiting the authentication count at the maximum value on the basis of attributes of a content by making determination as to whether or not the authentication count limitation conditions should be changed according to copy control information about the content, as well as the effect of limiting distribution to unspecified out-of-home appliances.

This embodiment has been described with respect to a case where copy control information is used as attribute information about contents. However, any other attribute information may be used. For example, content image quality information or DRM (Digital Rights Managements) information may be used. Also, the authentication count limitation parameters themselves may be stored and used as attribute information.

In this embodiment, the limitation conditions are changed by checking attribute information about contents only when the transmission time exceeds all the reference times. However, the limitation conditions may be changed in other cases by referring to attribute information.

Embodiment 5

<Outline>

A copyright protection system in Embodiment 5 has a medium type determination means of determining the type of transmission medium in the transmission route, sets reference times on the basis of transmission medium type information, and sets authentication count limitation conditions on the basis of the result of classification with reference to the set reference times.

<Configuration>

A transmitting apparatus and receiving apparatus constituting the copyright protection system of this embodiment are arranged as shown in FIG. 1, as are those in Embodiment 1.

Figure 15:
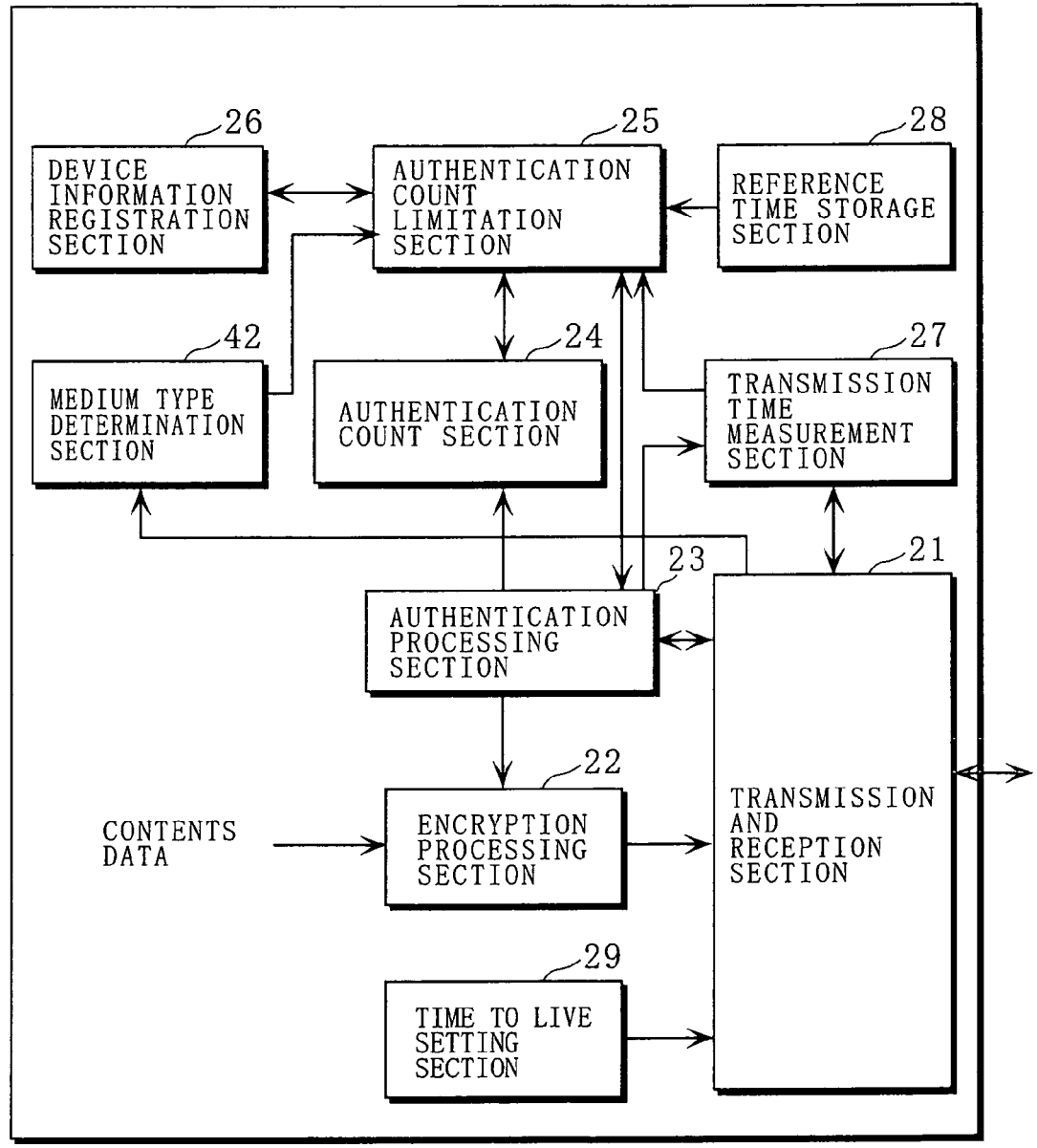
FIG. 15 is a diagram showing the configuration of an AV server in Embodiment 5 of the present invention.

FIG. 15 is a diagram showing the configuration of an AV server 1 representing the transmitting apparatus of this embodiment.

In FIG. 15, the same components as those in the AV server 1 described with reference to FIG. 2 in Embodiment 1 are indicated by the same reference numerals. The configuration of the AV server 1 of this embodiment differs from that in Embodiment 1 in that a medium type determination section 42 is provided while the limitation condition updating section 30 is not provided. In other respects, the configuration in this embodiment is the same as that in Embodiment 1.

The medium type determination section 42 obtains medium type information about a transmission medium in use from the transmission and reception section 21 of the AV server 1. Further, the medium type determination section 42 inquires, through the transmission and reception section 21, each of the receiving apparatus of the type of a transmission medium used in the receiving apparatus to obtain an information on the type of the transmission medium, and outputs the information on the determined type of medium as medium type information to the authentication count limitation section 25.

The configuration of receiving apparatus in this embodiment is as shown in FIG. 3, as is that in Embodiment 1.

In the above-described arrangement, the medium type determination section 42 corresponds to the medium type determination means of the present invention.

<Operation>

The operation of the AV server 1 in this embodiment differs from that in Embodiment 1 in that the reference time storage section 28 stores reference times set with respect to types of medium, and the two reference times used in the authentication count limitation section 25 are selected from the set times stored in the reference time storage section 28 according to medium type information obtained from the medium type determination section 42. In other respects, the operation of the AV server 1 in this embodiment is the same as that in Embodiment 1.

The medium type determination section 42 first obtains information on the type of a transmission medium used by the transmission and reception section 21 of the AV server 1 and information of the type of a transmission medium used by the transmission and reception section of each of the receiving apparatus (transmission and reception section 31 in the case of digital television set 2). If the types of medium differ from each other, one of the types of medium having a larger transmission delay is determined as medium type information used in processing described below. For example, from Ethernet and IEEE802.11b, IEEE802.11b having a larger transmission delay is selected as a type of medium.

The authentication count limitation section 25 sets authentication count limitation parameters by a procedure described below.

Figure 16:
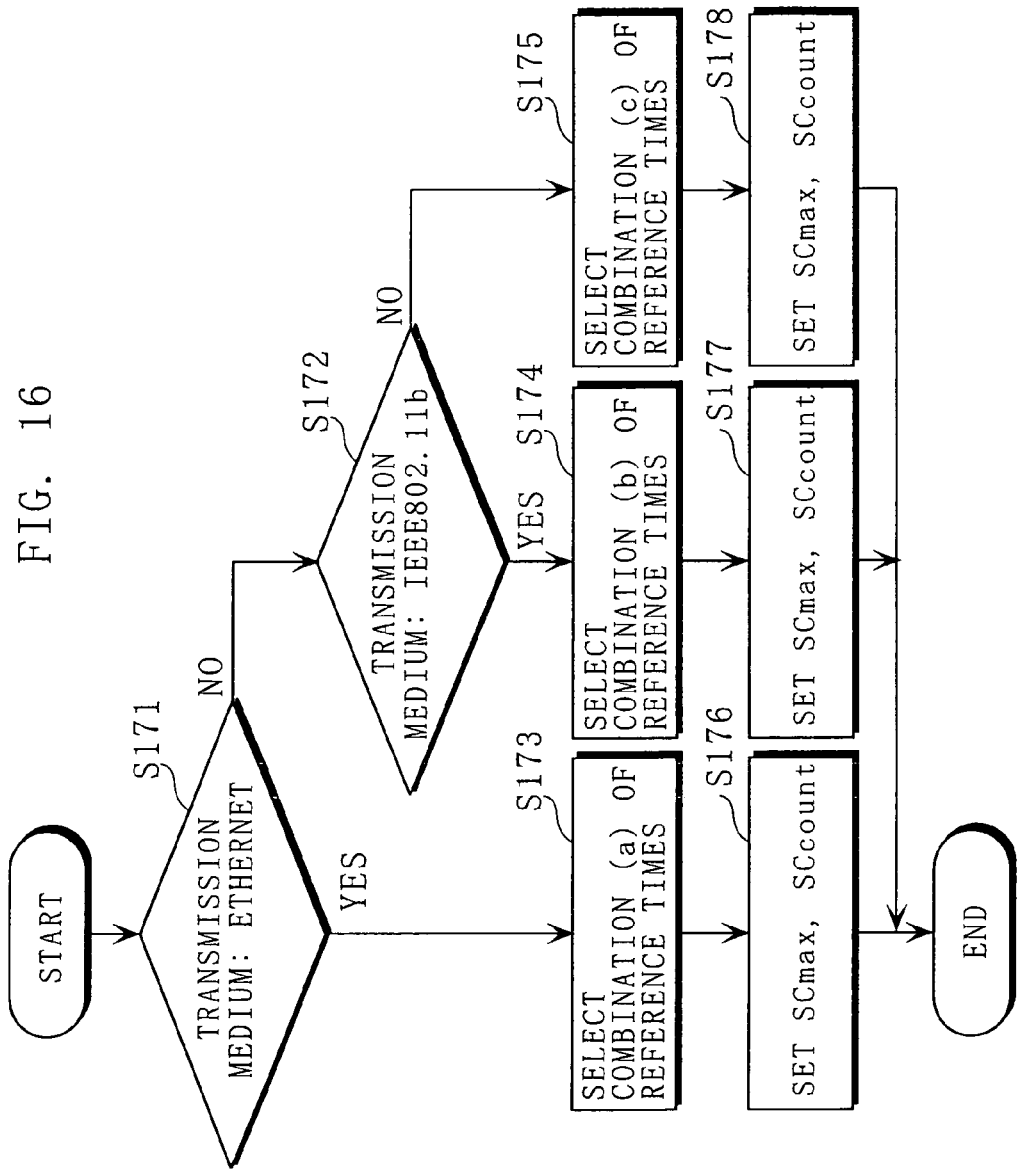
FIG. 16 is a flowchart at the time of setting of authentication count limitation parameters on the basis of the result of classification of the transmission time in Embodiment 5 of the present invention.

FIG. 16 is a flowchart showing a process in this embodiment in which the authentication count limitation section 25 sets authentication count limitation parameters.

The authentication count limitation section 25 checks a type of transmission medium (S171, S172), selects a combination (a) of reference times in step S173 if the type of transmission medium is Ethernet, and sets limitation parameters SCmax and SCcount on the basis of the combination (a) of reference times in step S176.

If the type of transmission medium is IEEE802.11b, the authentication count limitation section 25 selects a combination (b) of reference times in S174 and sets limitation parameters on the basis of the combination (b) of reference times selected in S177. If the type of medium is neither of the two types, the authentication count limitation section 25 selects a combination (c) of reference times in step S175 and sets limitation parameters on the basis of the combination (c) of reference times in step S178.

In this embodiment, combinations of reference times and limitation parameters are selected as shown below.

(1) In the case where the type of transmission medium is Ethernet

Combination (a) of reference times: reference time 1 (Tth1)=1 ms, reference time 2 (Tth2)=6 ms (2) In the case where the type of transmission medium is IEEE802.11b Combination (b) of reference times: reference time 1 (Tth1)=4 ms, reference time 2 (Tth2)=6 ms (3) In the case of other types of transmission medium Combination (c) of reference times: reference time 1 (Tth1)=2 ms, reference time 2 (Tth2)=6 ms The limitation parameters are set as shown below regardless of the type of medium.

In the case of the range (a) of transmission time in which the transmission time is equal to or shorter than reference time 1 (Tth1)

SCmax=62, SCcount=1

In the case of the range (b) of transmission time in which the transmission time is longer than reference time 1 (Tth1) and equal to or shorter than reference time 2 (Tth2)

SCmax=58, SCcount=5

In the case of the range (c) of transmission time in which the transmission time is longer than reference time 2 (Tth2)

SCmax=1, SCcount=62

The authentication count limitation section 25 conducts execution of processing according to an authentication request or refusal of the authentication request under the limitation conditions shown above.

In a case where the AV server 1 receives an authentication request from the PC 3, the type of medium in this case is IEEE802.11b and reference time 1=4 ms and reference time 2=6 ms are set. Since the transmission time of transmission to and from the PC 3 is T2 (3.22 ms), the limitation parameters in the case of the range (a) of transmission time are used.

Thus, the copyright protection system of this embodiment is capable of setting reference times and authentication count limitation conditions on the basis of the result of transmission time and information on the type of transmission medium. Therefore, the copyright protection system of this embodiment has an effect specific to this embodiment, i.e., the effect of setting reference times and authentication count limitation conditions on the basis of the delay time according to the type of transmission medium to execute suitable limitation of the authentication count, as well as the effect of limiting distribution to unspecified out-of-home appliances.

In this embodiment, reference times are set with respect to each type of medium, while the authentication count limitation parameters are constant irrespective of types of medium. The arrangement may alternatively be such that authentication count limitation parameters are changed with respect to types of medium, while reference times are fixed.

In this embodiment, types of medium: Ethernet and IEEE802.11b are identified. However, means of identifying other types of medium, e.g., IEEE802.11a and Bluetooth may also be provided to discriminate the other types.

Embodiment 6

<Outline>

A copyright protection system in Embodiment 6 has a billing information management means of managing billing information relating to limitation of the authentication count, and authentication limitation conditions are changed on the basis of the result of transmission time classification and billing information.

<Configuration>

A transmitting apparatus and receiving apparatus constituting the copyright protection system of this embodiment are arranged as shown in FIG. 1, as are those in Embodiment 1.

Figure 17:
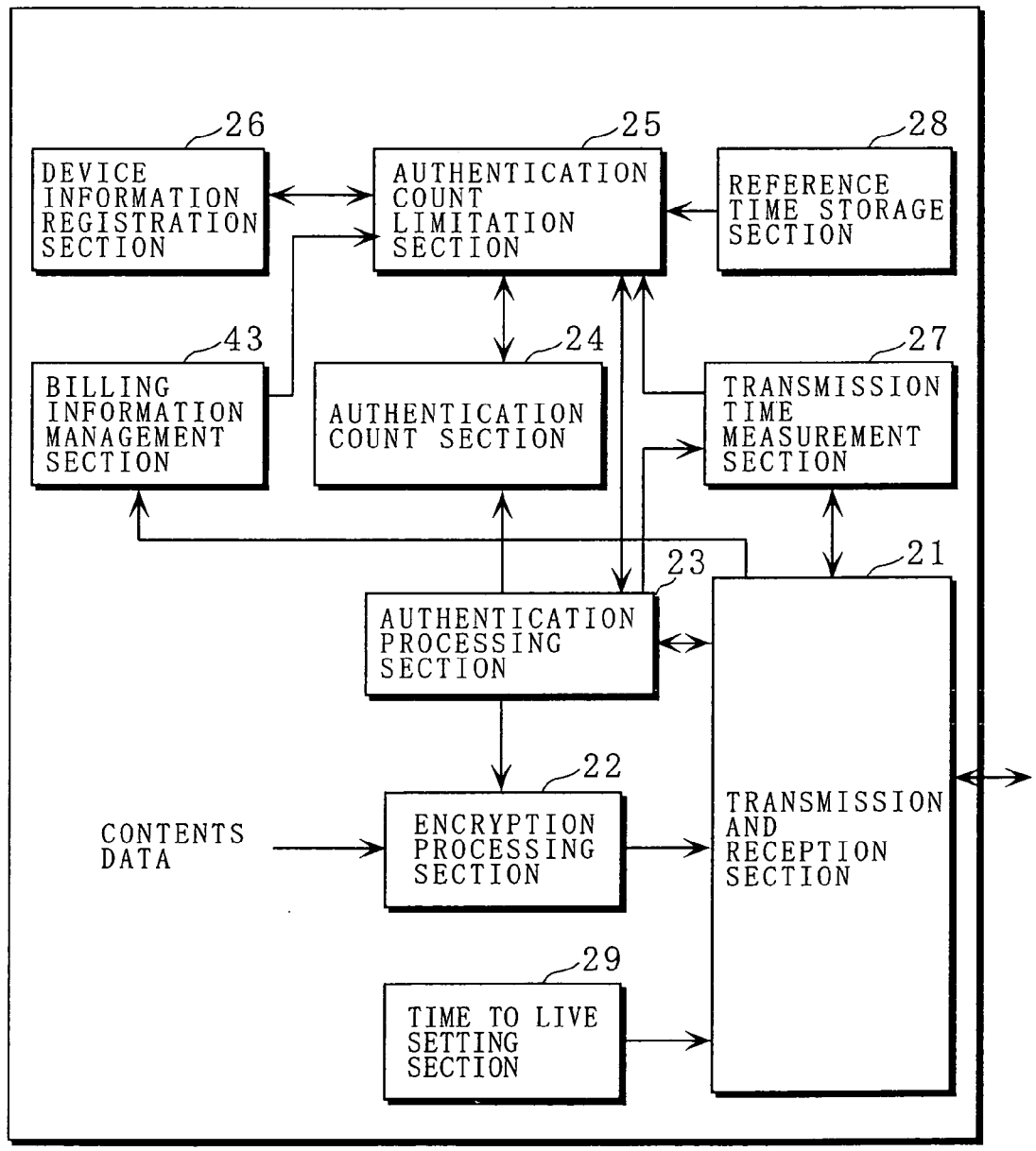
FIG. 17 is a diagram showing the configuration of an AV server in Embodiment 6 of the present invention.

FIG. 17 is a diagram showing the configuration of an AV server 1 representing the transmitting apparatus of this embodiment.

In FIG. 17, the same components as those in the AV server 1 described with reference to FIG. 2 in Embodiment 1 are indicated by the same reference numerals. The configuration of the AV server 1 of this embodiment differs from that in Embodiment 1 in that a billing information management section 43 is provided while the limitation condition updating section 30 is not provided. In other respects, the configuration in this embodiment is the same as that in Embodiment 1.

The billing information management section 43 manages billing information which is obtained through the transmission and reception section 21 and which relates to limitation of the authentication count, and outputs the billing information to the authentication count limitation section 25 according to a request from the authentication count limitation section 25. In this embodiment, information as to whether billing processing for cancellation of limitation of the authentication count with reference to the transmission time has been executed is managed.

The configuration of receiving apparatus in this embodiment is as shown in FIG. 3, as is that in Embodiment 1.

In the above-described arrangement, the billing information management section 43 corresponds to the billing information management means of the present invention.

<Operation>

The operation of the AV server 1 in this embodiment differs from that in Embodiment 1 in that the method of authentication count limitation by the authentication count limitation section 25 comprises setting authentication count limitation conditions by means of referring to billing information obtained from the billing information management section 43. In other respects, the operation of the AV server 1 in this embodiment is the same as that in Embodiment 1.

Figure 18:
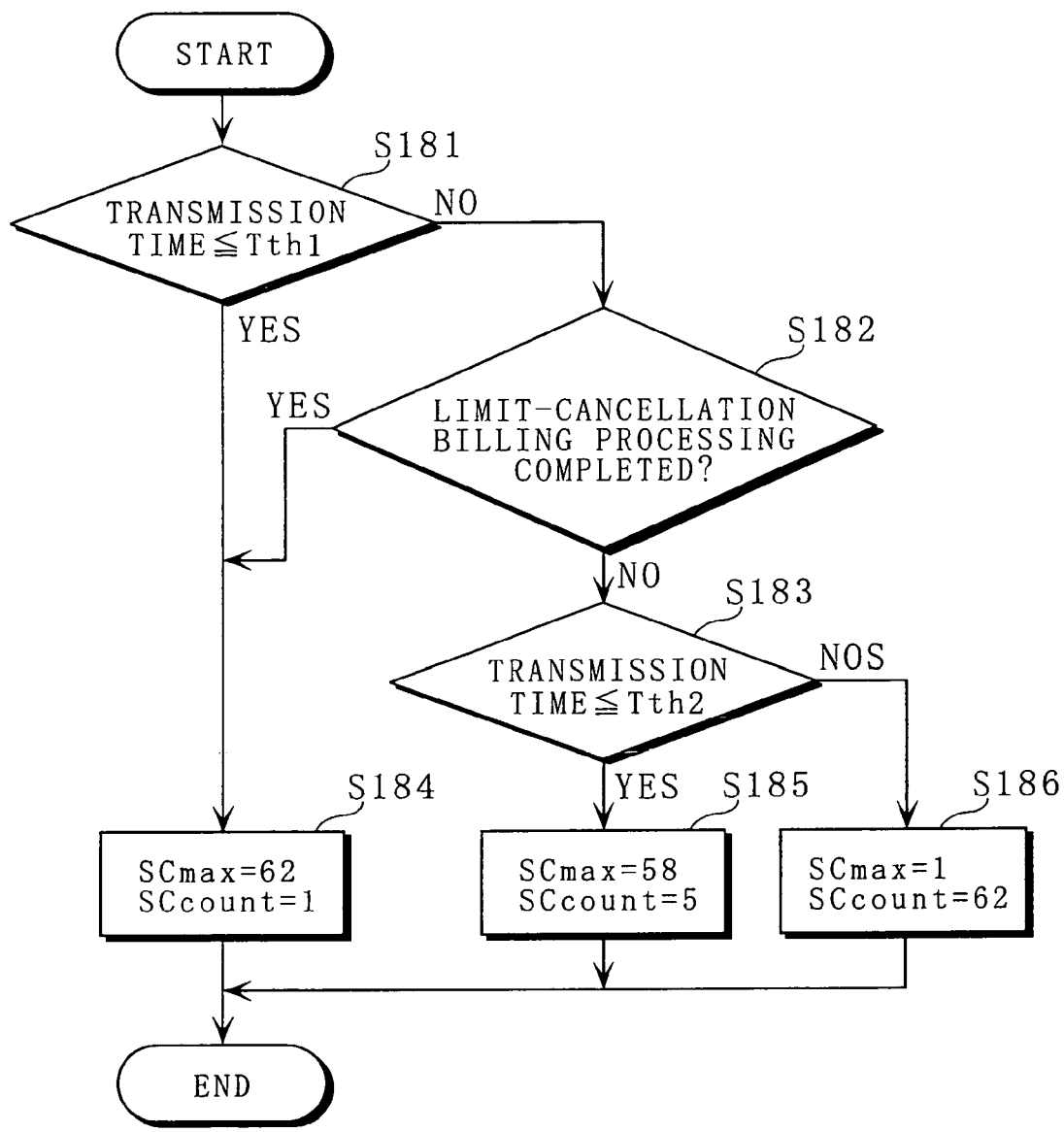
FIG. 18 is a flowchart at the time of setting of authentication count limitation parameters on the basis of the result of classification of the transmission time in Embodiment 6 of the present invention.

FIG. 18 is a flowchart showing a process in this embodiment in which the authentication count limitation section 25 sets authentication count limitation parameters.

The authentication count limitation section 25 compares the transmission time with reference time a (Tth1) (S181), determines that the transmission time falls into the range (a) of transmission time if the transmission time is equal to or shorter than Tth1, and sets SCmax=62 and SCcount=1 (S184). If the transmission time is longer than Tth1, the authentication count limitation section 25 determines that the transmission time falls into the range (b) of transmission time and checks billing information (S182). If billing processing for cancellation of authentication count limitation has been performed, the process advances to step S184. If billing processing for cancellation of authentication count limitation has not been performed, the authentication count limitation section 25 compares the transmission time with reference time 2 (Tth2) in step S183, determines that the transmission time falls into the range (c) of transmission time if the transmission time is equal to or shorter than Tth2, and sets SCmax=58 and SCcount=5 (S185). If the transmission time is longer than Tth2, the authentication count limitation section 25 determines that the transmission time falls into the range (c) of transmission time, and sets SCmax=1 and SCcount=62 (S186).

The authentication count limitation section 25 conducts execution of processing according to an authentication request or refusal of the authentication request under the limitation conditions shown above.

In a case where the AV server 1 receives an authentication request from the digital television set 7, the transmission time is T4 and falls into the range (c) of transmission time, as described above in the description of Embodiment 1. However, if billing processing for cancellation of authentication count limitation with reference to the transmission time has been performed, the ordinary limitation conditions are set.

Thus, the copyright protection system of this embodiment is capable of setting authentication count limitation conditions on the basis of the result of transmission time classification and billing information relating to authentication count limitation with reference to the transmission time. Therefore, the copyright protection system of this embodiment has an effect specific to this embodiment, i.e., the effect of managing distribution of contents to unspecified out-of-home appliances through billing by executing, according to billing information, cancellation of authentication count limitation with reference to the transmission time, as well as the effect of limiting distribution to unspecified out-of-home appliances.

In this embodiment, cancellation of authentication count limitation by executing billing is performed on the transmitting apparatus. However, the arrangement may alternatively be such that billing is performed with respect to each of contents to be transmitted and limitation cancellation is performed with respect to each content, or billing is performed on each receiving apparatus and limitation cancellation is performed with respect to each receiving apparatus.

In this embodiment, billing processing is performed for cancellation of limitation with reference to the transmission time. However, billing may be performed on increment of the maximum authentication count.

Embodiment 7

<Outline>
In a copyright protection system in Embodiment 7, the device ID of each receiving apparatus and the transmission time of transmission to and from the receiving apparatus are registered and, when the authentication count reaches the maximum value and when a request for authentication is newly made, the authentication count limitation section 25 checks whether any of the registered receiving apparatus has a transmission time longer than the transmission time of the receiving apparatus that has made the authentication request, and, if one of the registered receiving apparatus has a longer transmission time, the authentication count limitation section 25 enables newly-requested authentication by canceling the authentication of the registered receiving apparatus.

<Configuration>
A transmitting apparatus and receiving apparatus constituting the copyright protection system of this embodiment are arranged as shown in FIG. 1, as are those in Embodiment 1.

The configuration of an AV server 1 representing the transmitting apparatus in this embodiment is as shown in FIG. 2, as is that in Embodiment 1.

The configuration of receiving apparatus in this embodiment is as shown in FIG. 3, as is that in Embodiment 1.

<Operation>
The operation of the AV server 1 in this embodiment differs from that in Embodiment 1 in the method of authentication count limitation by the authentication count limitation section 25 and in registration of information relating to the receiving apparatus by the device information registration section 26. In other respects, the operation of the AV server 1 in this embodiment is the same as that in Embodiment 1.

Description will be made of the authentication count limitation method and registration of information relating to the receiving apparatus in this embodiment.

The authentication count limitation section 25 sets limitation parameters SCmax and SCcount relating to limitation of the authentication count by the same procedure as that in Embodiment 1 shown in FIG. 6.

Figure 19:
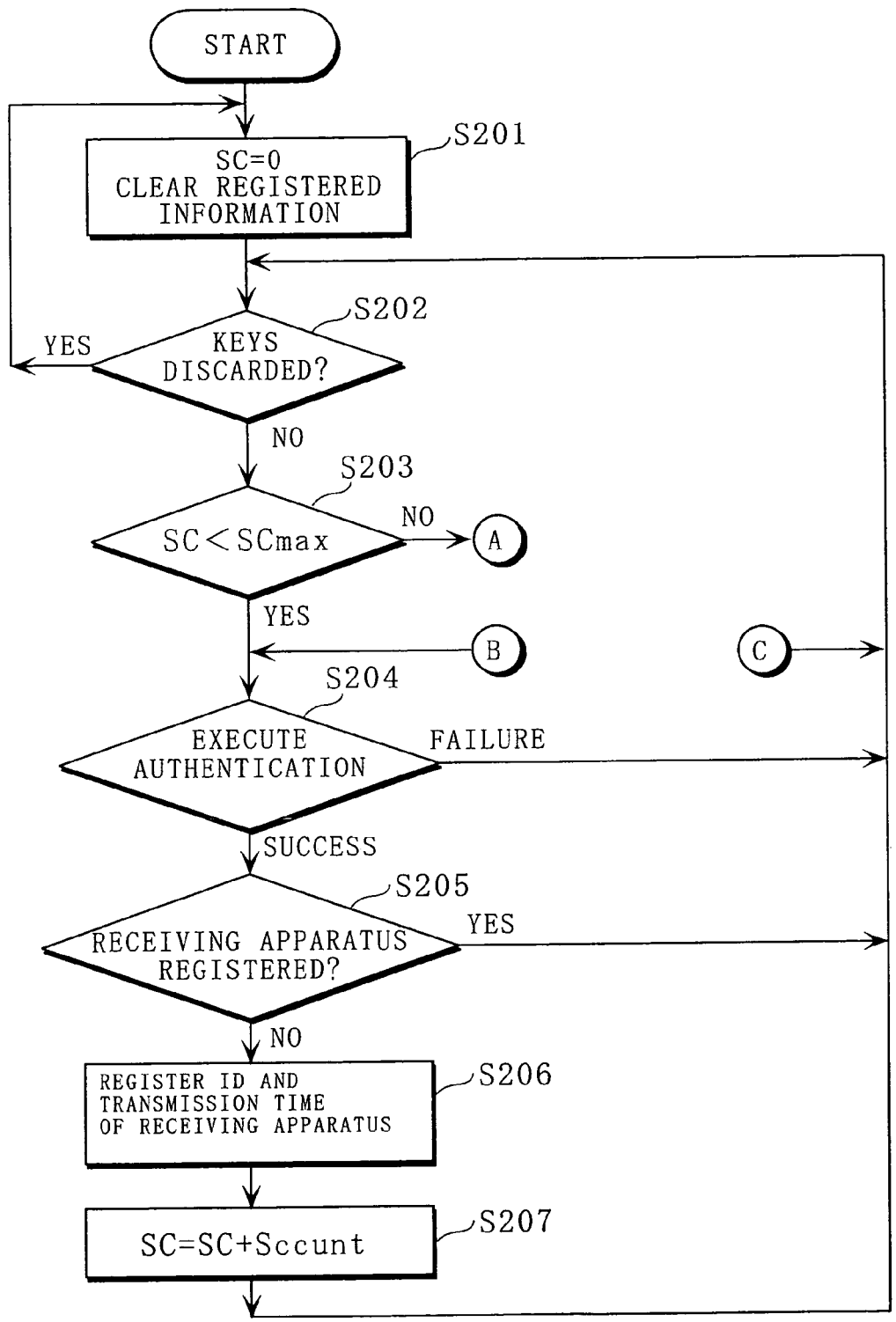
FIG. 19 is a portion of a flowchart at the time of authentication execution determination and execution of authentication conducted by the authentication count limitation section in Embodiment 7 of the present invention.
Figure 20:
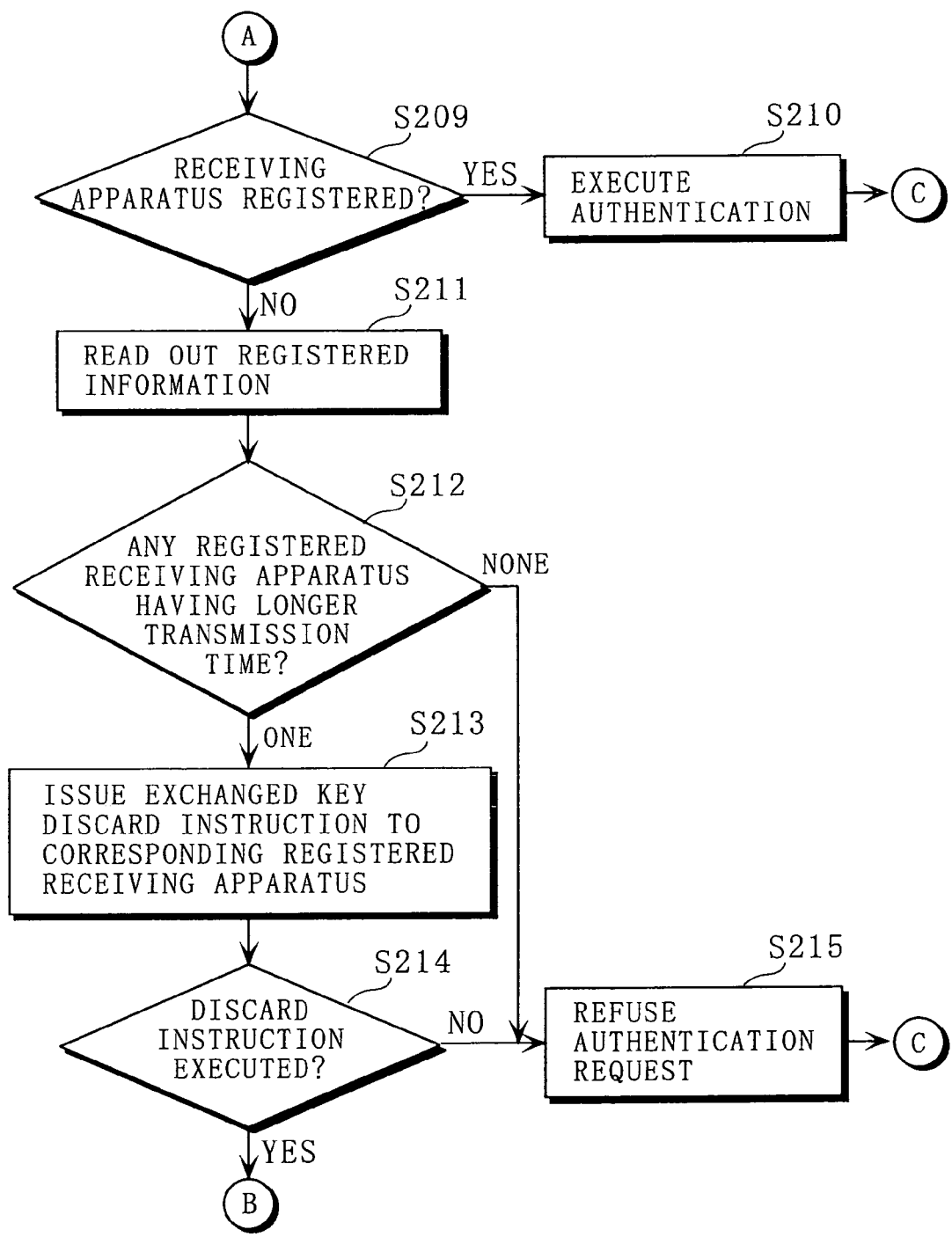
FIG. 20 is another portion of the flowchart at the time authentication execution determination and execution of authentication conducted by the authentication count limitation section in Embodiment 7 of the present invention.

FIGS. 19 and 20 are flowcharts showing the operation at the time of authentication execution determination by the authentication count limitation section 25 and execution of authentication.

The authentication count limitation section 25 first initializes the authentication count (SC) in the authentication count section 24 (S201) and checks keys to be exchanged in the case of success in authentication (S202). If the keys have been discarded, the process returns to step S201. If the keys have not been discarded, the authentication count limitation section 25 compares the authentication count SC with the maximum value SCmax (S203). If SC<SCmax, the process advances to step S204. In the other case, the process moves to step S209 shown in FIG. 20.

In S204, the authentication count limitation section 25 outputs the determination result as authentication execution permission to the authentication processing section 23 to make the same execute authentication. If authentication results in success, the process advances to step S205. If authentication results in failure, the process moves to step S202. In step S205, the authentication count limitation section 25 checks whether or not the device ID of the appliance that has made the authentication request has been registered in the device information registration section 26. If the corresponding device ID has been registered, there is no need to increment SC and, therefore, the process returns to step S201. If the device ID has not been registered, the authentication count limitation section 25 registers the device ID of the receiving deice and the measured transmission time in the device information registration section 26 (S206) and increments the authentication count SC in the authentication count section 24 by the count increment value SCcount (S207).

In step S209 (FIG. 20), a check is made as to whether or not the receiving apparatus has been registered. If the receiving apparatus has been registered, authentication is executed (S210) and the process returns to step S202 (FIG. 19). If the receiving apparatus has not been registered, the existing registered information is read from the device information registration section 26 (S211) and a search is made for any one of the registered receiving apparatus having a longer transmission time (S212).

If the corresponding receiving apparatus exists, the process advances to step S213. If no corresponding receiving apparatus exists, the authentication request is refused (S215) and the process returns to step S202 (FIG. 19). In step S213, a key discard instruction is issued to the corresponding receiving apparatus. If the discard instruction is executed, the process returns to step S204 (FIG. 19). If the instruction is not executed, the authentication request is refused (S215) and the process returns to step S202 (FIG. 19).

Description will be made of a case where the AV server 1 authenticates another of the receiving apparatus (not shown) having a transmission time falling into the range (a) of transmission time, that is, not longer than the reference time Tth1, and receives authentication requests from the PC 6 and the PC 3 after the authentication count SC has become SC=53.

The PC 6 has transmission time T3 which falls into the range (b) of transmission time. The corresponding limitation parameters are SCmax=58 and SCcount=5. In this case, the authentication count after success in authentication is SC=58.

Thereafter, when the authentication request comes from the PC 3, the transmission time of the PC 3 is T2 in the range (b) of transmission time. Accordingly, the corresponding limitation parameters are SCmax=58 and SCcount=5. Since the current authentication count is SC=58, the process branches off for processing shown in FIG. 20. In this case, (PC 6 transmission time T3>PC 3 transmission time T2), that is, the registered receiving apparatus having a transmission time longer than that of the receiving apparatus making the authentication request exists. Therefore the authentication count limitation section 25 issues a key discard instruction to the PC 6. After confirming that the key for the PC 6 has been discarded, authentication of the PC 3 can be executed.

Thus, in the copyright protection system of this embodiment, the device ID of each receiving apparatus and the transmission time of transmission to and from the receiving apparatus are registered and, when the authentication count reaches the maximum value and when a request for authentication is newly made, the authentication count limitation means checks whether any of the registered receiving apparatus has a transmission time longer than the transmission time of the receiving apparatus that has made the authentication request, and, if one of the receiving apparatus has a longer transmission time, the authentication count limitation means enables newly-requested authentication by canceling the authentication of the registered receiving apparatus.

Therefore, the copyright protection system of this embodiment has an effect specific to this embodiment, i.e., the effect of enabling execution of authentication according to a newly-made authentication request by canceling the authentication of a receiving apparatus having a longer transmission time, i.e., probable to exist outside a home, even after the maximum value of the authentication count has been reached, as well as the effect of limiting distribution to unspecified out-of-home appliances.

The description has been made by assuming that only one receiving apparatus exists as an object on which authentication cancellation should be performed, and that the maximum authentication count is maintained. However, if two or more receiving apparatus have a transmission time longer than that of the receiving apparatus that has made an authentication request, the authentication of one the receiving apparatus having the longest transmission time may be cancelled. Further, a plurality of devices may be selected in decreasing order of transmission time as objects on which authentication cancellation should be performed to provide a margin of increment of the authentication count.

Embodiment 8

<Outline>

A copyright protection system in Embodiment 8 has a transmission mode determination section 44 which determines the transmission mode of transmission routes forming a network, and changes authentication count limitation conditions on the basis of the result of transmission time classification and transmission mode information.

<Configuration>

Figure 21:
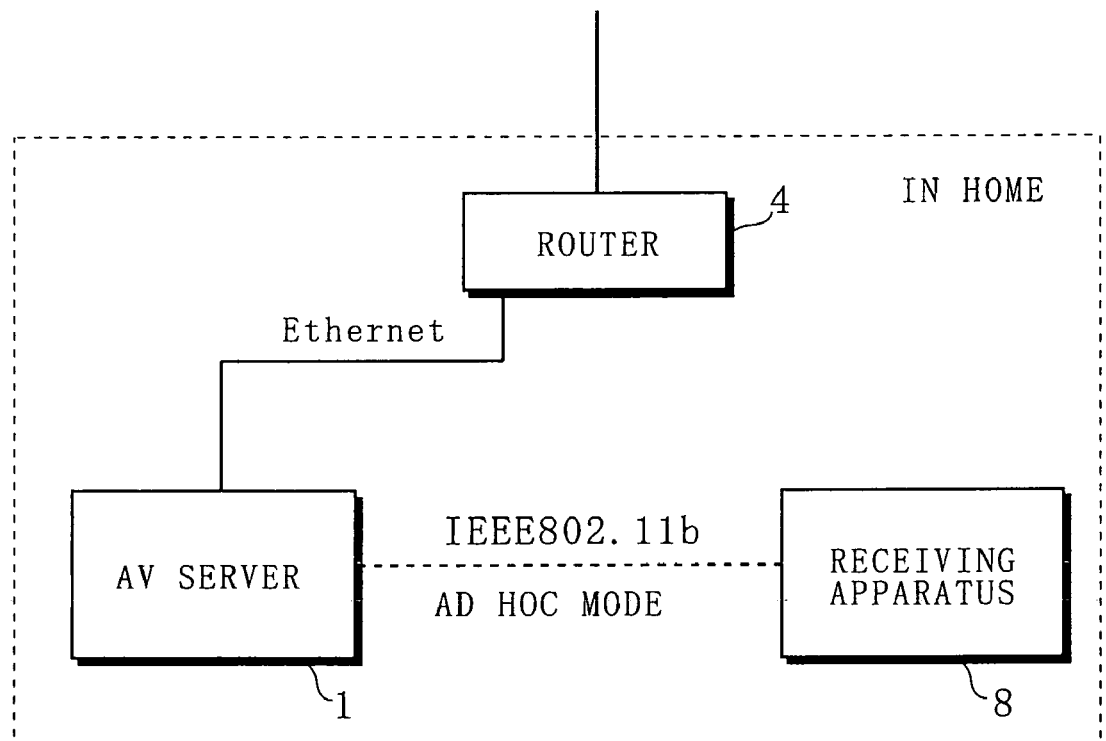
FIG. 21 is a diagram showing the configuration of a copyright protection system in Embodiment 8 of the present invention.

FIG. 21 is a diagram showing a transmitting apparatus and receiving apparatus constituting the copyright protection system of this embodiment. In this embodiment, appliances in a home include an AV server 1, which is a transmitting apparatus, and a receiving apparatus 8. The AV server 1 and the receiving apparatus 8 perform transmission in the ad hoc mode in accordance with IEEE802.11b.

Figure 22:
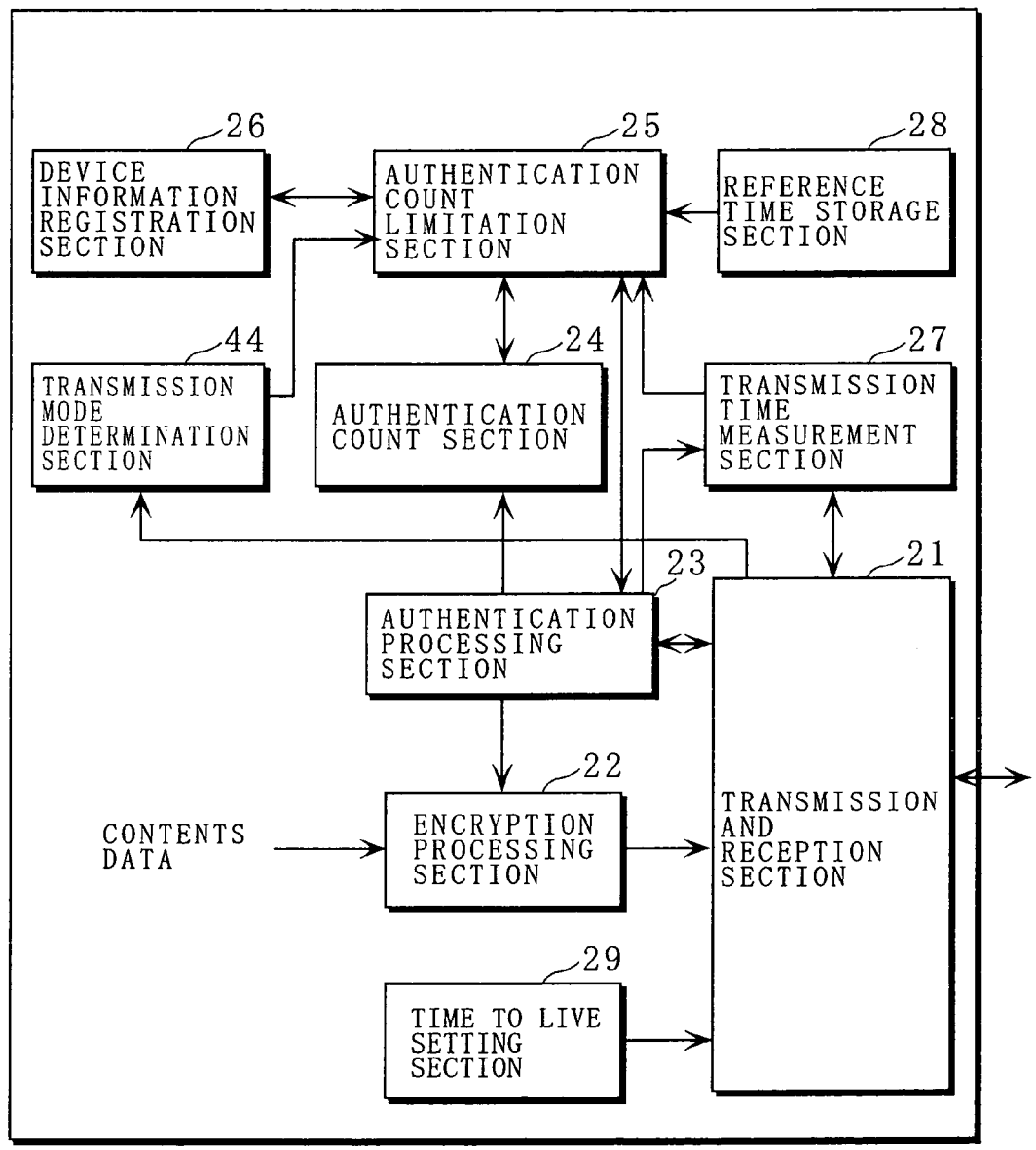
FIG. 22 is a diagram showing the configuration of an AV server in Embodiment 8 of the present invention.

FIG. 22 is a diagram showing the configuration of the AV server 1, i.e., the transmission device in this embodiment.

In FIG. 22, the same components as those in the AV server 1 described with reference to FIG. 2 in Embodiment 1 are indicated by the same reference numerals. The configuration of the AV server 1 of this embodiment differs from that in Embodiment 1 in that the transmission mode determination section 44 is provided while the limitation condition updating section 30 is not provided. In other respects, the configuration in this embodiment is the same as that in Embodiment 1.

The transmission mode determination section 44 obtains information on the mode of a transmission route in use from the transmission and reception section 21 of the AV server 1, and outputs the information as transmission mode information to the authentication count limitation section 25.

The configuration of receiving apparatus in this embodiment is as shown in FIG. 3, as is that in Embodiment 1.

In the above-described arrangement, the transmission mode determination section 44 corresponds to the transmission mode determination means of the present invention.

<Operation>

The operation of the AV server 1 in this embodiment differs from that in Embodiment 1 in that the method of authentication count limitation by the authentication count limitation section 25 comprises setting authentication count limitation conditions by means of referring to transmission mode information obtained from the transmission mode determination section 44. In other respects, the operation of the AV server 1 in this embodiment is the same as that in Embodiment 1.

Figure 23:
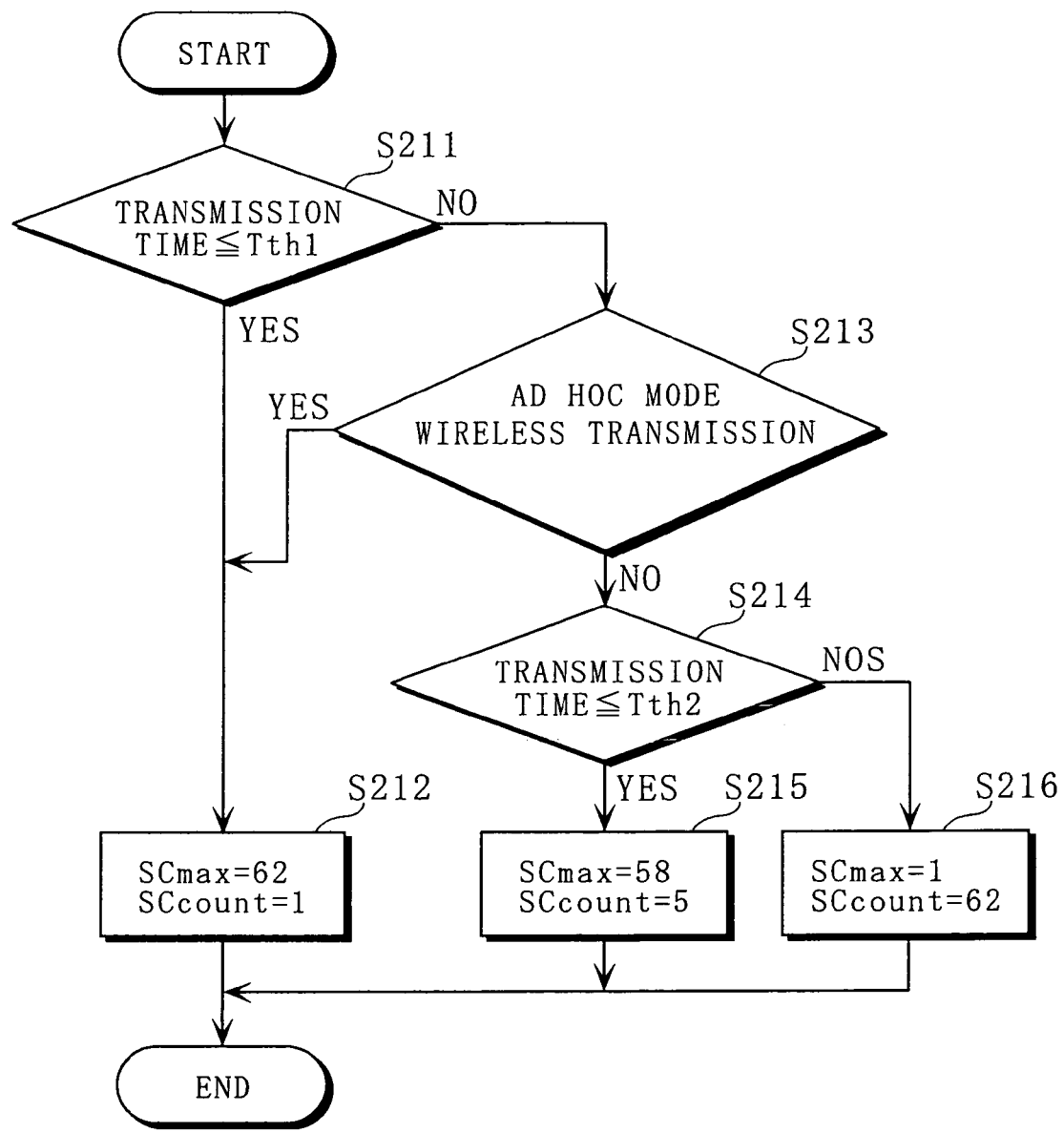
FIG. 23 is a flowchart at the time of setting of authentication count limitation parameters on the basis of the result of classification of the transmission time in Embodiment 8 of the present invention.

FIG. 23 is a flowchart showing the process of setting authentication count limitation parameters in this embodiment.

The transmission mode determination section 44 obtains information on the transmission mode used by the transmission and reception section 21 of the AV server 1.

The authentication count limitation section 25 compares the transmission time with reference time 1 (Tth1) (S211) and sets SCmax=62 and SCcount=1 if the transmission time is equal to or shorter than Tth1. If the transmission time is longer than Tth1, the authentication count limitation section 25 checks the transmission mode information (S213). In the case of wireless transmission in the ad hoc mode, the process advances to step S212. In the other case, the authentication count limitation section 25 compares the transmission time with reference time 2 (Tth2) in step S214 and sets SCmax=58 and SCcount=5 (S215) if the transmission time is equal to or shorter than Tth2. If the transmission time is longer than Tth2, the authentication count limitation section 25 sets SCmax=1 and SCcount=62 (S216).

The authentication count limitation section 25 conducts execution of processing according to an authentication request or refusal of the authentication request under the limitation conditions shown above.

When the AV server 1 and the receiving apparatus 8 perform wireless communication transmission in the ad hoc mode, they can be regarded as directly and wirelessly communicating with each other. In such a situation, therefore, even if the transmission time is longer than the reference times and determined as falling into the range of transmission time related to the severe limitation conditions, the corresponding authentication count limitation conditions are not applied.

Thus, the copyright protection system of this embodiment is capable of setting authentication count limitation conditions on the basis of the result of transmission time classification and transmission mode information. Therefore, the copyright protection system of this embodiment has an effect specific to this embodiment, i.e., the effect of avoiding unnecessary authentication count limitation processing in such a manner that limitation of the authentication count with reference to the transmission time is not performed in a situation where it can be determined from transmission mode information that the transmitting apparatus and the receiving apparatus are directly communicating with each other, as well as the effect of limiting distribution to unspecified out-of-home appliances.

This embodiment has been described with respect to a case of wireless transmission in ad hoc mode according to transmission mode information. However, any other transmission mode information may be used if the transmitting apparatus and the receiving apparatus can be determined as close to each other in the mode corresponding to the transmission mode information.

While the copyright protection system in each of the above-described embodiments corresponds to the data management system of the present invention, the data use management system of the present invention may process not only AV data strictly copyright-protected but also any other sort of data. For example, the data use management system of the present invention may be applied to the distribution of data which is used while the copyright for the data is abandoned, but which, for some reason, should not be leaked out.

Authentication in accordance with the present invention is not limited to authentication for supplying a key for encrypted data. It may be authentication for determination as to whether or not data which is not encrypted should be distributed. That is, use of data which is any kinds of authentication in accordance with the present invention may be decryption of encrypted data or simple distribution of data and is not limited to its concrete implemented forms.

While the AV server 1 provided as a transmitting apparatus has been described as one capable of operating by performing the same authentication that for DTCP, the present invention is not limited to the described authentication system. Any other authentication system may be used. Therefore, device IDs may be those provided and set from any place other than the key management center. In short, those enabling receiving apparatus to be uniquely identified may suffice.

In each of the above-described embodiments, the time to live setting section 29 is provided to check the time to live of the authentication command and AV data. However, this arrangement may be removed. That is, the arrangement of the present invention may be implemented independently of authentication systems using existing networks.

The program in accordance with the present invention may be a program for making a computer perform the functions of all or part of the means (devices) in the above-described data use management system and transmitting apparatus having the management function in accordance with the present invention, the program operating in cooperation with the computer.

The present invention also comprises a medium on which is held a program for making a computer perform the functions of all or part of means in the above-described data use management system and transmitting apparatus having the management function in accordance with the present invention, and from which the program can be read with the computer to perform the above-described functions in cooperation with the computer.

The above-mentioned "part of the means (or devices)" of the present invention denotes several means in the plurality of means of the present invention or part of the functions of one of the plurality of means.

Also, part of the devices of the present invention denotes several devices in the plurality of devices, part of the means in one of the devices, or part of the functions of one of the plurality of means.

The present invention also comprises a computer-readable recording medium on which the program in accordance with the present invention is recorded.

In one form of use of the program in accordance with the present invention, the program may be recorded on a computer-readable recording medium and may operate in cooperation with a computer.

In one form of use of the program in accordance with the present invention, the program may be transmitted through a transmission medium and read to a computer, and may operate in cooperation with the computer.

The data structure in accordance with the present invention includes a database, a data format, a data table, a data list and sorts of data.

The recording medium comprises a ROM. The transmission medium comprises a transmission system such as the Internet, light, radio waves and sound waves.

The above-described computer of the present invention is not limited to a piece of pure hardware such as a CPU. It may comprise a piece of firmware, an OS, and a peripheral device.

As described above, the configuration of the present invention may be implemented in software or hardware form.

As is apparent from the foregoing, the present invention enables management of use of data by limiting use of the data by unspecified external appliances.

The data use management system, the transmitting apparatus having a management function and the data use management method in accordance with the present invention have the effect of enabling management of use of data by limiting use of the data by unspecified external appliances and are useful, for example, when used for a network in which data which needs copyright protection is handled or when used as devices or the like constituting the network.

What is claimed is:

1. A data use management system comprising at least one receiving apparatus connected to a network and capable of receiving and using predetermined data, and a transmitting apparatus which transmits the data to said receiving apparatus via said network, wherein use of the data on said network is managed on the basis of a transmitting time for transmission of predetermined information between said transmitting apparatus and said receiving apparatus, wherein said transmitting apparatus has:

transmission time measuring means of measuring the transmission time for transmission of the predetermined information for measurement between said transmitting apparatus and said receiving apparatus;

reference time storage means of storing a plurality of reference times;

transmitting-side authentication means of comparing the transmission time and the plurality of reference times, thereby determining to which one of ranges of transmission time classified on the basis of the reference times the transmission time belongs, determining, on the basis of the result of said determination, whether or not said receiving apparatus having the transmission time is permitted to use the predetermined data, and performing authentication if said receiving apparatus is permitted to use the predetermined data; and authentication count means of incrementing an authentication count which is a number of instances of authentication performed by said transmitting-side authentication means, wherein said receiving apparatus has receiving-side authentication means of performing authentication with said transmitting-side authentication means, and wherein said transmitting apparatus compares the authentication count with a maximum authentication count determined in advance with respect to each of the ranges of transmission time, and inhibits further authentication if the authentication count is larger than the maximum authentication count;

wherein said transmitting-side authentication means sets the maximum authentication count to a smaller value based on a result of said classification of the plurality of ranges so that a class with greater transmission time is set to the smaller value of the maximum authentication count.

2. A transmitting apparatus having a management function for enabling at least one receiving apparatus connected to a network and configured to receive and use data via said network, said transmitting apparatus comprising:

transmission time measuring means of measuring the transmission time for transmission of predetermined information between said transmitting apparatus and said receiving apparatus;

reference time storage means of storing a plurality of reference times;

transmitting-side authentication means of comparing the measured transmission time and the plurality of reference times to determine to which one of a plurality of ranges the transmission time belongs, the plurality of ranges being classified based on the plurality of reference times and of determining, based on which one of the plurality of ranges the measured transmission time belongs, whether or not said receiving apparatus having the corresponding measured transmission time is permitted to use the data, and performing authentication if said receiving apparatus is permitted to use the data;

authentication count means of incrementing an authentication count which is a number of instances of authentication performed by said transmitting-side authentication means; and a management function of comparing the incremented authentication count with a maximum authentication count determined in advance with respect to each of the plurality of ranges, and inhibiting further authentication if the incremented authentication count is larger than the maximum authentication count;

wherein said transmitting-side authentication means sets the maximum authentication count to a smaller value based on a result of said classification of the plurality of ranges so that a class with greater transmission time is set to the smaller value of the maximum authentication count.

3. The transmitting apparatus having the management function according to claim 2, wherein said receiving apparatus includes a unique identifier, and when said transmitting-side authentication means performs authentication with said receiving device, and the authentication of said receiving apparatus results in success, said transmitting-side authentication means identifies said receiving apparatus through said identifier.

4. The transmitting apparatus having the management function according to claim 3, wherein, when an authentication request is sent, said transmitting-side authentication means determines, through said unique identifier, whether or not the authentication request received is from the same apparatus as said receiving apparatus for which authentication has already been made successfully.

5. The transmitting apparatus having the management function according to claim 3, wherein said transmitting-side authentication means registers the measured transmission time together with said unique identifier and keeps the maximum value of the authentication count equal to or smaller than a predetermined number by canceling at least one of the authentications of a plurality of the registered receiving apparatus if the authentication count reaches the maximum value when authentication is newly performed.

6. The transmitting apparatus having the management function according to claim 5, wherein if the registered receiving apparatus has a measured transmission time longer than a transmission time measured at a time of newly performing authentication when the authentication of any one of the registered receiving apparatus is cancelled, said transmitting-side authentication means cancels the authentication of the registered receiving apparatus having a longest transmission time.

7. The transmitting apparatus having the management function according to claim 2, wherein if the incremented authentication count is equal to or larger than the predetermined maximum authentication count, said transmitting-side authentication means performs control such that said transmitting-side authentication means does not accept an authentication request from said receiving apparatus.

8. The transmitting apparatus having the management function according to claim 2, further comprising:

reference time setting means of setting the reference time based on a result of measuring the transmission time required for transmission of the predetermined information over a predetermined reference route.

9. The transmitting apparatus having the management function according to claim 2, wherein said transmitting-side authentication means sets, with respect to each class in said classification, a count increment value by which said authentication count means increments a count.

10. The transmitting apparatus having the management function according to claim 2, wherein the maximum authentication count is determined with respect to each class in classification of the plurality of ranges;

said authentication count means increments the incremented authentication count with respect to each class in said classification; and said transmitting-side authentication means limits the incremented authentication count so that the incremented authentication count with respect to each class in said classification does not exceed the maximum authentication count.

11. The transmitting apparatus having the management function according to claim 2, further comprising attribute information management means of managing attribute information about the data transmitted over said network, wherein said transmitting-side authentication means limits the incremented authentication count based on the result of classification of the plurality of ranges and the attribute information.

12. The transmitting apparatus having the management function according to claim 11, wherein copy control information is used as the attribute information.

13. The transmitting apparatus having the management function according to claim 2, further comprising medium type determination means of determining a type of medium in transmission routes constituting said network, wherein said transmitting-side authentication means sets the reference time according to the type of medium, and limits the incremented authentication count according to a result of classification of the plurality of ranges made based on the set reference time.

14. The transmitting apparatus having the management function according to claim 13, wherein when said medium type determination means detects the existence of a plurality of types of medium in the transmission routes, and selects the transmission medium type presumed to have a longest transmission time among the detected transmission media, and
wherein said transmitting-side authentication means uses the selected type of medium for setting of the reference time.

15. The transmitting apparatus having the management function according to claim 2, further comprising transmission mode determination means of determining a transmission mode in transmission routes constituting said network,
wherein said transmitting-side authentication means does not limit the incremented authentication count based on a result of classification of the plurality of ranges if the determined transmission mode is a predetermined transmission mode with no authentication count limitation with respect to the measured transmission time.

16. The transmitting apparatus having the management function according to claim 2, further comprising billing information management means of managing billing information,
wherein said transmitting-side authentication means limits the incremented authentication count based on a result of classification of the plurality of ranges and the billing information.

17. The transmitting apparatus having the management function according to claim 2, further comprising updating means of updating, according to input information externally supplied, at least one of the reference time and authentication count limitation conditions used by said transmitting-side authentication means.

18. The transmitting apparatus according to any one of claims 2-8 and 9-17, wherein the data uses copyright protection.

19. A program stored on a computer-readable medium for making a computer act as
the transmission time measuring means of measuring the transmission time required for transmission of the predetermined information between said transmitting apparatus and said receiving apparatus, act as the reference time storage means of storing the at least one reference time act as the transmitting-side authentication means and act as the authentication count means of incrementing the incremented authentication count which is the number of instances of the authentication performed by said transmitting-side authentication means, according to claim 2.

20. A data use management method, comprising steps of:
when transmitting data via a network from a transmitting apparatus to at least one receiving apparatus connected to the network and capable of receiving and using the data, permitting access to the data by the at least one receiving apparatus via the network based on a transmitting time for transmission of predetermined information between the transmitting apparatus and said receiving apparatus exceeding one value,
measuring the transmission time for transmission of the predetermined information between said transmitting apparatus and said receiving apparatus,
comparing the measured transmission time and a plurality of reference times to determine to which one of a plurality of ranges the transmission time belongs, the plurality of ranges being classified based on the plurality of reference times, and determining, based on which one of the plurality of ranges the measured transmission time belongs, whether or not said receiving apparatus having the corresponding measured transmission time is permitted to use the data,
performing authentication if said receiving apparatus is permitted to use the data,
incrementing the authentication count which is a number of instances of authentication performed,
comparing the increased authentication count with a maximum authentication count determined in advance with respect to each of the plurality of ranges, and inhibiting further authentication if the incremented authentication count is larger than the maximum authentication count, and
setting the maximum authentication count to a smaller value based on a result of said classification of the plurality of ranges in the authentication so that a class with greater transmission time is set to the smaller value of the maximum authentication count.

21. A recording medium having the program stored thereon and configured to be processed using a computer, the program executing the method including
measuring the transmission time for transmission of predetermined information between a transmitting apparatus and a receiving apparatus;
storing a plurality of reference times;
comparing the measured transmission time and the plurality of reference times to determine to which one of a plurality of ranges the transmission time belongs, the plurality of ranges being classified based on the plurality of reference times;
determining, based on which one of the plurality of ranges the measured transmission time belongs, whether or not said receiving apparatus having the corresponding measured transmission time is permitted to use the data;
performing authentication if said receiving apparatus is permitted to use the data;
incrementing an authentication count which is a number of instances of authentication performed;
comparing the incremented authentication count with a maximum authentication count determined in advance with respect to each of the plurality of ranges; and
inhibiting further authentication if the incremented authentication count is larger than the maximum authentication count;
setting the maximum authentication count to a smaller value based on a result of said classification of the plurality of ranges in the authentication so that a class with greater transmission time is set to the smaller value of the maximum authentication count.

* * * * *

UNITED STATES PATENT AND TRADEMARK OFFICE
CERTIFICATE OF CORRECTION

| | | |
|---|---|---|
| PATENT NO. | : 7,487,351 B2 | Page 1 of 1 |
| APPLICATION NO. | : 10/806272 | |
| DATED | : February 3, 2009 | |
| INVENTOR(S) | : Yasushi Ayaki et al. | |

It is certified that error appears in the above-identified patent and that said Letters Patent is hereby corrected as shown below:

Title Page

At item (56) References Cited, U.S. PATENT DOCUMENTS, please insert
-- 6,633,316   10/2003   Maddalozzo et al.   715/854 --.

Signed and Sealed this
Third Day of May, 2011

David J. Kappos
*Director of the United States Patent and Trademark Office*